United States Patent [19]
Murai

[11] Patent Number: 5,568,414
[45] Date of Patent: Oct. 22, 1996

[54] NONLINEAR OPERATION UNIT AND DATA PROCESSING APPARATUS USING THE NONLINEAR OPERATION UNIT

[75] Inventor: Kazumasa Murai, Kanagawa, Japan

[73] Assignee: Fuji Xerox Co., Ltd., Tokyo, Japan

[21] Appl. No.: 216,017

[22] Filed: Mar. 21, 1994

[30] Foreign Application Priority Data

Mar. 22, 1993 [JP] Japan .................. 5-085157

[51] Int. Cl.$^6$ ..................... G06G 7/02
[52] U.S. Cl. ................. 364/825; 364/724.16
[58] Field of Search .............. 364/825, 724.03, 364/724.16

[56] References Cited

U.S. PATENT DOCUMENTS

| | | | |
|---|---|---|---|
| 4,920,507 | 4/1990 | Takeda | 364/724.03 X |
| 4,935,702 | 6/1990 | Mead et al. | |
| 4,967,161 | 10/1990 | Furuhata et al. | 364/825 X |
| 5,023,821 | 6/1991 | Argintaru et al. | 364/825 X |

FOREIGN PATENT DOCUMENTS 48-20932  3/1973  Japan .

OTHER PUBLICATIONS

Koga et al., "High-Speed Analog-Neural-Network LSI for Neuro-Processing Type Optical WDM Demultiplexer", Electric/Electronics/Information/Communication Academy NC90-53, pp. 83-90.

Von V. Chalupa et al., "Trainingsmethoden beim Einsatz eines Zeitvektorenklassifikators", Regulungstechnik Und Prozess-Datenverarbeitung, vol. 18, No. 11, pp. 500-503, Nov. 1970.

Linares-Barranco et al., "Modular T-Mode Neural Network Learning Hardware Implementations with Analog Storage Capability", IJCNN International Joint Conference On Neural Networks, vol. 1, pp. I-202-I-207, Jun. 1992.

Perfetti, "L1 Normalisation in Neural Networks Using Parallel Automatic Level Control", Electronic Letters, vol. 26, No. 2, pp. 82-84, Jan. 1990.

Millman, "Microelectronics", McGraw-Hill Book Company, New York, pp. 529-533, 1979.

*Primary Examiner*—Tan V. Mai
*Attorney, Agent, or Firm*—Finnegan, Henderson, Farabow, Garrett & Dunner, L.L.P.

[57] ABSTRACT

A nonlinear operation unit includes a nonlinear function unit for receiving at least one input signal and performing a nonlinear computing operation on the input signal. A multiplying unit multiplies the resulting function value by a weight value. An adder unit adds together the results of the multiplying operations to achieve a summation to which a threshold value is added.

9 Claims, 20 Drawing Sheets

NONLINEAR OPERATION UNIT AND DATA PROCESSING APPARATUS USING THE NONLINEAR OPERATION UNIT

BACKGROUND OF THE INVENTION

1. Field of the Invention

The present invention relates to an apparatus for performing computing operations according to the neural network theory. More particularly, the invention relates to a nonlinear operation unit of simple circuit constructions and improved accuracy, and a data processing apparatus using the nonlinear operation units.

2. Discussion of the Prior Art

A neural-network basis apparatus having the functions of computing operations, storage, learning and the like has been realized by circuits and operation means, which are modeled on each neuron. The fact that most of the outputs of nerves become the inputs of other nerves has been well known. Also in the neural-network basis apparatus, the output signal of the circuit and the operation means, which are modeled on a neuron, frequently become the input signal of the circuit and operation means, which are modeled on another neuron. By convention, a neural network is constructed by combining those neuron circuits and operation means. Accordingly, the neural network includes the neuron circuits and operation means, which are necessary for forming each neuron but are omissible in light of constructing the overall network. In other words, the conventional neural network must include unnecessary circuits and operation means.

The neuron linearly multiplies the signals from other neurons in accordance with a strength of bonding of synapses for transferring the signals, adds the results of multiplying operations from the synapses of the neuron to the threshold value of the neuron, and transfers the output signals, which are equivalent to the results of the process carried out by the nonlinear function, to other neurons, through the synapses. The conventional art constructs the neuron circuits and operation means in a similar order. An example of this is described in "High-Speed Analog Neural Network LSI for Neuro Processing Type Light Demultiplexes", Electric/Electronics/Information/Communication Academy NC90-53 (Article 1). The synapses of each neuron are constructed by a circuit corresponding to a linear multiplier circuit, invented by Gilbert and disclosed in Japanese Patent Laid-Open Publication No. Sho. 48-20932 (Article 2). The output currents of the synapses are added together. Then, a nonlinear characteristic is gained by a differential amplifier. The current is converted into a corresponding voltage, which is then used as an output signal of the neuron. A neural circuitry based on the neural circuitry theory is constructed by connecting the circuits modeled on the neurons. When carefully studying the Gilbert multiplier circuit, it is seen that the multiplier circuit is made up of a multiplier core circuit and a circuit for correcting the nonlinearity of the multiplier core circuit. These circuits each include a circuit for converting a voltage difference into a current difference. Generally, this voltage-to-current converting circuit suffers from an appreciable error. The circuit including diode-connected transistors also suffers from an appreciable error arising from a variation of the characteristics of the elements, which is caused during the manufacturing process. Therefore, it is impossible to perfectly correct the nonlinearity of the multiplier core circuit. The Gilbert multiplier circuit is attendant with an error, although appreciable. For this reason, an error owing to the nonlinearity is observed in the multiplier characteristic, as described on page 87, FIG. 5 in the article 2. The nonlinear function circuit using the differential amplifier, which is connected to the output of the multiplier circuit, also causes an error. The nonlinear function circuit is influenced by temperature of the elements. The input sensitivity of the circuit is proportional to absolute temperature. Consequently, the characteristic of the overall neural network also varies. When a signal passes through multiple stages of circuits, the error is accumulated to increase. In an extreme case, it is next to impossible to realize desired functions.

The computing operation of a nonlinear function is performed at the output of another neuron. If this computing operation is performed in the synapses, it little affects the operation of an overall neural network, when taking account of the fact that most of the output signal of a neuron become the input signal to another neuron.

SUMMARY OF THE INVENTION

The present invention has been made in view of the above circumstances and has an object to simplify the units corresponding to nerves and a high speed computing operation, while keeping the operation of an overall neural network unchanged.

Another object of the present invention is to provide a simple analog circuit of the unit corresponding to each nerve, and to reduce errors arising from temperature variation and the circuits per se, and computing time.

To achieve the above object, the present invention has been achieved by provision of a nonlinear operation unit which comprises: nonlinear function operation means for receiving at least one input signal and performing the computing operation of the input signal by using a nonlinear function; multiplying means for multiplying the function value as the results of the computing operation by said nonlinear function operation means by a weight value; and adder means for adding together the results of the multiplying operations by said multiplying means and adding a threshold value to the sum.

Further, a nonlinear operation unit according to the invention comprises: nonlinear function operation means for performing the computing operation of a function, which produces the results of operations equivalent to the results of the process carried out by computing at least one input signal by using a nonlinear function, and multiplying the results of the computing operations by weight values; and adder means for adding together the results of the computing operations by the nonlinear function operation means and adding a threshold value to the sum of these results.

Still further, a nonlinear operation unit according to the invention, having nonlinear function operation means for performing the computing operation of a function, which produces the results of operations equivalent to the results of the process carried out by computing at least one input signal by using a nonlinear function, and multiplying the results of the computing operations by weight values, and adder means for adding together the results of the computing operations by the nonlinear function operation means and adding a threshold value to the sum of these results, wherein said nonlinear function operation means includes differential amplifier circuits, each said differential amplifier circuit consisting of a pair of amplifier elements each having at least three terminals, said paired amplifier elements being coupled with each other at the first terminals, a voltage difference proportional to the input signal is applied to between the second terminals of said paired amplifier elements each having at least three terminals, a current proportional to the weight is fed to the first terminals, whereby the output signal is produced as a current difference at the third terminals of the amplifier elements each having at least three terminals and constituting differential amplifier circuits.

Still further, a nonlinear operation unit according to the invention, having nonlinear function operation means for performing the computing operation of a function, which produces the results of operations equivalent to the results of the process carried out by computing at least one input signal by using a nonlinear function, and multiplying the results of the computing operations by weight values, and adder means for adding together the results of the computing operations by the nonlinear function operation means, said nonlinear function operation means comprises: a first differential amplifier circuit including first and second amplifier elements of at least three terminals being connected to each other at the first terminals; and a second differential amplifier circuit including third and fourth amplifier elements of at least three terminals being connected to each other at the first terminals; wherein the second terminals of the first and fourth amplifier elements of at least three terminals are connected to form a first input terminal the second terminals of the second and third amplifier elements of at least three terminals are connected to form a second input terminal, a voltage proportional to the input signal is applied to between the first and second input terminals, the third terminals of the first and third amplifier elements of at least three terminals are connected to form a first output terminal, the third terminals of the second and fourth amplifier elements of at least three terminals are connected to form a second output terminal, a current difference proportional to the weight value is supplied to the first terminals of the first second differential amplifier circuits, whereby a current difference proportional to the product of multiplying a positive or negative value and the result of processing the input signal by a bounded, monotonous function is produced at the first and second output terminals.

Still further, a data processing apparatus according to the invention, which comprises a plural number of nonlinear operation units each having nonlinear function operation means for performing the computing operation of a function, which produces the results of operations equivalent to the results of the process carried out by computing at least one input signal by using a nonlinear function, and multiplying the results of the computing operations by weight values, and adder means for adding together the results of the computing operations by the nonlinear function operation means and adding a threshold value to the sum of these results, whereby a desired function is set up by properly setting the weight and threshold values.

Still further, a data processing apparatus according to the invention, having a plural number of nonlinear operation units each having nonlinear function operation means for performing the computing operation of a function, which produces the results of operations equivalent to the results of the process carried out by computing at least one input signal by using a nonlinear function, and multiplying the results of the computing operations by weight values, and adder means for adding together the results of the computing operations by the nonlinear function operation means and adding a threshold value to the sum of these results, whereby a desired function is set up by properly setting the weight and threshold values, said data processing apparatus comprising: means for detecting a difference between a desired output and an actual output, and means for automatically altering the weight value and the threshold value on the basis of the detected difference, by a back-propagation method.

BRIEF DESCRIPTION OF THE DRAWINGS

The accompanying drawings, which are incorporated in and constitute a part of this specification, illustrate embodiments of the invention, and together with the description, serve to explain the objects, advantages and principles of the invention. In the drawings.

DETAILED DESCRIPTION OF THE PREFERRED EMBODIMENTS

Figure 1:
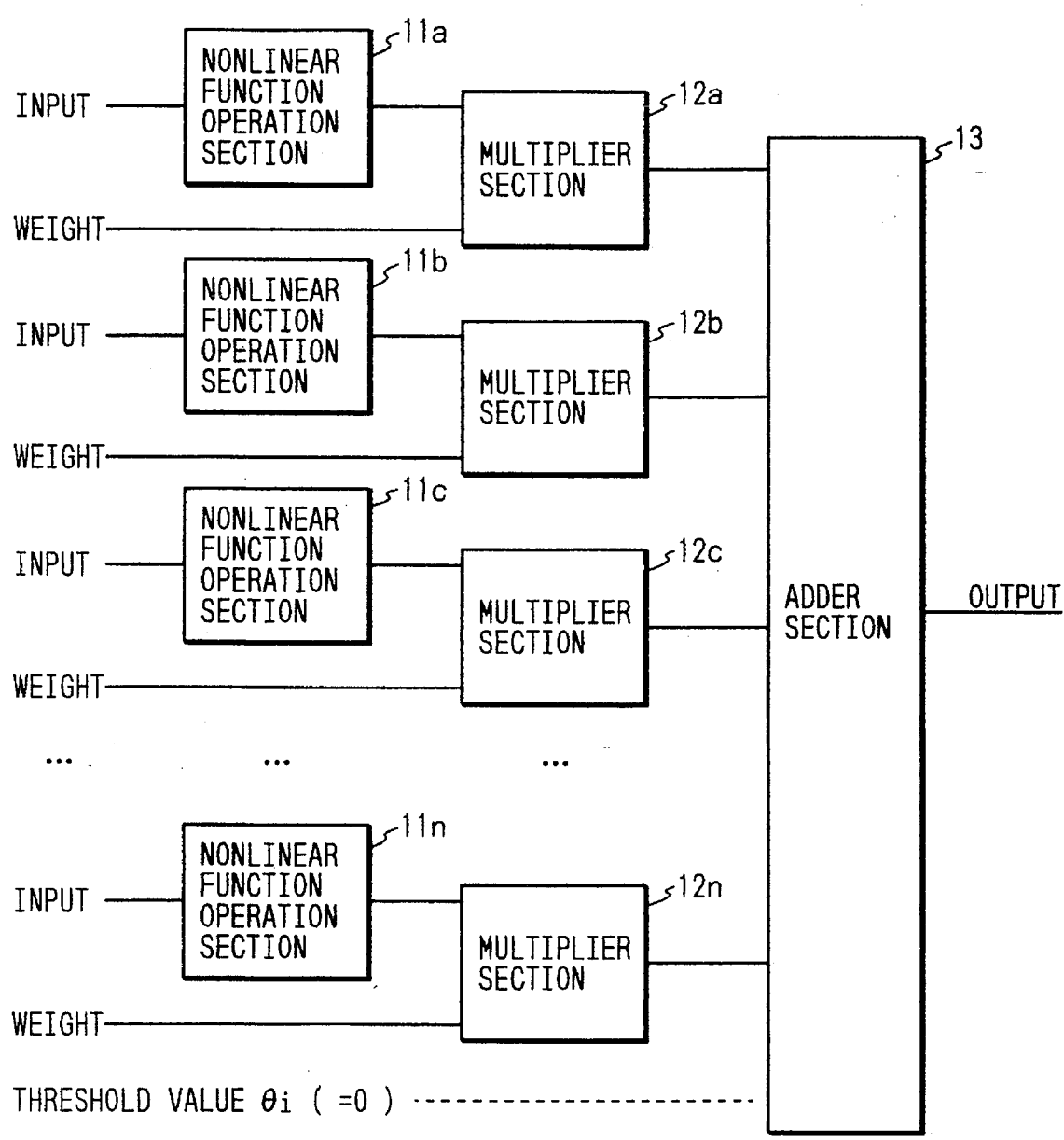
FIG. 1 is a block diagram showing a nonlinear operation unit according to an embodiment of the present invention.

Before preceding with the detailed description of the invention, major technical ideas of the present invention to achieve the above objects and the operations of the invention will briefly be described.

A nonlinear operation apparatus of the invention comprises: nonlinear function operation means (11a to 11n in FIG. 1 and 31a to 31n in FIG. 3) for receiving at least one input signal and performing the computing operation of the input signal by using a nonlinear function (g(uj)); multiplying means (2a to 2n in FIG. 1 and 32a to 32n in FIG. 3) for multiplying the function value as the results of the computing operation by said nonlinear function operation means by a weight value (wj1);and adder means (13 in FIG. 1 and 33 in FIG. 3) for adding together the results of the multiplying operations by said multiplying means and adding a threshold value to the sum. If required, the threshold value (θi) is set at 0 and a means for adding the threshold value may be omitted.

In this specification, the term "weight" represents a value, optionally set, to be multiplied by the result of the nonlinear computing operation. The weight corresponds to "weight" or "strength of bonding" in the neural network. The term "threshold value" indicates a value, optionally set, to be added to the sum of the results of the multiplying operation, and corresponds to "threshold value" in the neural network.

In the neural network theory, the output xi of a serve i is given by $$xi = g(ui) \quad (1)$$

$$ui = \Sigma j\{wji \cdot xj\} + \theta i \quad (2)$$

where uj: inner potential of a nerve neuron i wji: strength of bonding of a nerve neuron j to another nerve neuron i θi: threshold value of the nerve neuron i g: logistic function of real number→real number xj: output potential of the neuron j The conventional circuit modeled on the neuron in the neural network, which computes the equations (1) and (2), is made up of a multiplier section for multiplying an input signal xj and a weight value wji, an adder section for adding together the results of multiplications by the multiplying section, and a section for computing the output signal of the adder section by a nonlinear function g(ui). The present invention provides such a circuit for computing an equation (4) to be given later. The operation of a network constructed with the circuits of the invention as unit cells is equivalent to the operation of an overall neural network.

The output signal of a neuron j is given by $$uj = g(uj) \quad (3)$$

where uj: internal potential of the nerve neuron j.

Therefore, the internal potential of the neurons j is expressed as $$uj = \Sigma j\{wji \cdot xg(uj)\} + \theta i \quad (4)$$

In the present invention, as seen from the equation (4), each input uj is computed by using a nonlinear function g. The result of each computation is multiplied by a weight wji, which corresponds to the strength of bonding. The results of the multiplying operations are summed. A threshold value θj of the neuron is added to the sum. The result is the internal potential. Also in another neuron, there is no need of computing a value corresponding to the output potential since the computing operation is based on the inner potential of another neuron. In the equation (4), the threshold value θj may be set at 0, as described above.

Figure 5:
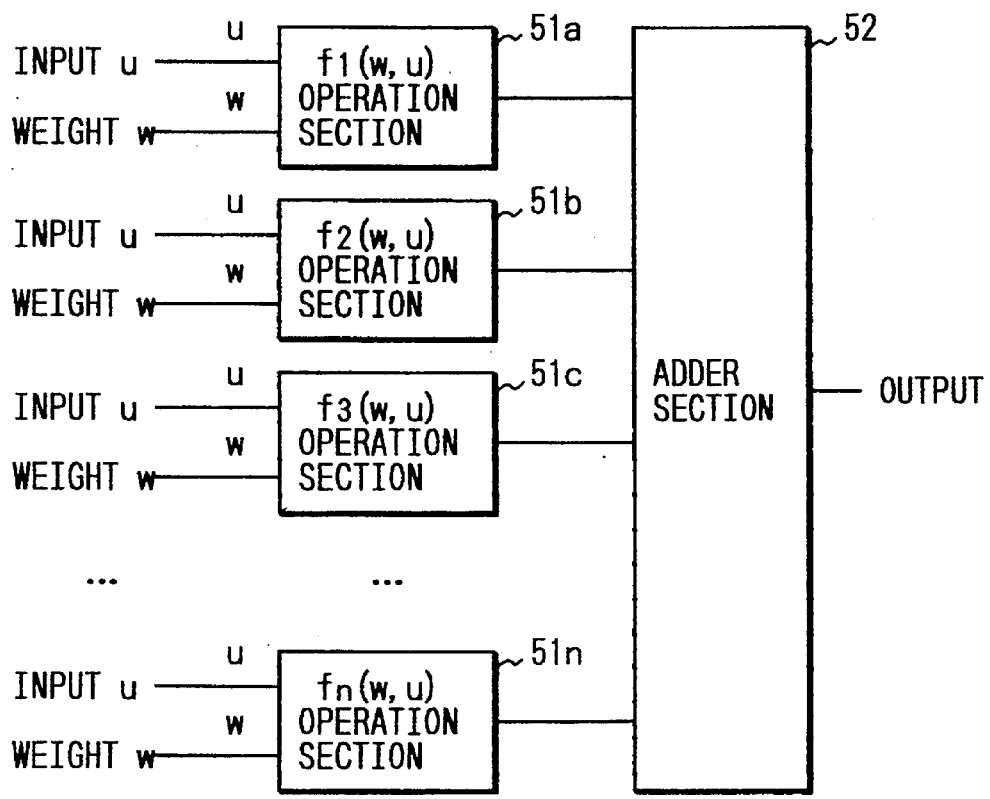
FIG. 5 is a block diagram showing a nonlinear operation unit for performing the operation of an equation (6)

A nonlinear operation apparatus according to another embodiment of the present invention comprises nonlinear function operation means (71a to 71n in FIG. 7) for performing the computing operation of a function (f(wji, uj)), which produces the results of operations equivalent to the results of the process carried out by computing at least one input signal (uj) by using a nonlinear function, and multiplying the results of the computing operations by weight values (wji), and adder means (72 in FIG. 7) for adding together the results of the computing operations by the nonlinear function operation means and adding a threshold value to the sum of these results. If required, the threshold value (θi) is set at 0 and a means for adding the threshold value may be omitted (FIG. 5). In the specification, the terms "nonlinear function operation means" or "nonlinear function operation section" means a means for performing a nonlinear operation alone, and also a means for performing a function, which produces the results equivalent to the results of the nonlinear operation and the multiplying operation.

A function f of real number χ real number→real number is defined as follows:

$$f(w, u) = w \cdot g(u) \quad (5)$$

The internal potential of each neuron can be written using the function f $$u_i = \Sigma_j \{f(w_{ji}, u_j)\} + \theta_i \quad (6)$$

When using the function f as defined above, the internal potentials of all the neurons in a neural network can be obtained not computing the output potentials of the neurons.

In a normal apparatus based on the neural network theory, the input signal to a neuron and the output signal to another neuron are expressed in terms of the output potential of the neuron. In the invention, the internal potential of the neuron is used for the input signal from exterior and the output signal to exterior. As in the embodiment to be given later, a desired input/output relation can be obtained without converting it into the output potential of the neuron.

In the present invention, a function value is obtained using a function (wji, uj), which produces the results of operations equivalent to the results of the process carried out by computing each input signal uj by using a nonlinear function, and multiplying the result of the computation by the weight wji corresponding to the strength of bonding. The results of the computing operations are summed and added to the threshold value θi. In this way, the internal potential of the neuron is obtained. The function can be obtained by a digital computer apparatus, but it can easily be realized by a apparatus including an analog circuitry.

When it is realized using the digital computing apparatus, complexes can be handled in the computing process. Where the real numbers are used for all the values during the computing process, design of an actual apparatus is easy.

In the digital computer, general methods to represent the real numbers are floating-point representation and the fixed-point representation, both being of the fixed accuracy type. The values represented by the methods are contained in the finite subset of real numbers. In embodying the invention, if the real numbers are used for the inputs, computing process, and outputs, and the finite subset of real numbers that can be handled by a digital computing apparatus is used for at least a part of the computing process, the results of computation are within a tolerable difference. Thus, if the accuracy is limited, and a part or the whole of the computing process is carried out by the digital computing apparatus, the results of computing operations can be obtained as desired.

In another approach, a part of the computing process is carried out by a digital computing apparatus, using the finite subset, the remaining computing process is carried out by an analog computing apparatus. In this case, the quantities of the type in which the real numbers cannot be expressed by the digital computing apparatus may be expressed by continuous quantities, such as time and volume.

In an additional approach, the real numbers of the inputs, computing process, outputs are expressed in terms of current or voltage proportional to the real numbers. The current or voltage is processed by analog electronic circuit means.

In one preferred mode of the present invention, the nonlinear function operation means is expressed by an analog electronic circuit. The analog electronic circuit includes differential amplifier circuits. Each differential amplifier circuit consists of a pair of amplifier elements each having at least three terminals (for example, 3-terminal amplifier elements such as bipolar transistors, field effect transistors, and pentode electrode tubes, and amplifier elements of four or more terminals, such as multi-gate transistors and multielectrode tubes). The paired amplifier elements are coupled with each other at the first terminals (for example, the emitters of the bipolar transistors, the sources of the field effect transistors, and the cathodes of the electron tubes). A voltage difference proportional to the input signal is applied to between the second terminals (bases of the bipolar transistors, the gates of the field effect transistors, and the grids of the electron tubes) of the paired amplifier elements each having at least three terminals and constituting the differential amplifier circuits. A current proportional to the weight, which is used for obtaining the product, is fed to the first terminals (emitters, sources, and the cathodes). As a result, an output signal is produced as a current difference at the third terminals (collectors of the bipolar transistors, the drains of the field effect transistors, and the plates of the electron tubes) of the differential circuit.

In a specific example of the differential amplifier using the bipolar transistors (FIG. 13), the difference $I_{C1}-I_{C2}$ between the collector currents $I_{C1}$ and $I_{C2}$ of each transistor is expressed $$I_{C1} - I_{C2} = I_E \tanh((V_{B2} - V_{B2})/2V_T) \quad (7)$$

This circuit can produce a current difference proportional to the product of multiplying a function value that is obtained by applying a hyperbolic tangent function as a logistic function to the input voltage difference by the emitter total current $I_E$. This characteristic may be functioned as means for producing the operation results equivalent to the products of multiplying the function values, which are obtained by computing the input signals by using the nonlinear function, by weight values.

If $I_E$ is set at a fixed value, it may be operated as means for obtaining the function values of a nonlinear function of each input signal.

To change the sign of weight, the nonlinear function operation means comprises:

(1) a first differential amplifier circuit (151 in FIG. 15) including first and second amplifier elements of at least three terminals being connected to each other at the first terminals (emitters, sources or cathodes);

(2) a second differential amplifier circuit (152 in FIG. 15) including third and fourth amplifier elements of at least three terminals being connected to each other at the first terminals (emitters, sources or cathodes); wherein the second terminals (bases, gates, or grids) of the first and fourth amplifier elements of at least three terminals are connected to form a first input terminal (Vin1), the second terminals of the second and third amplifier elements of at least three terminals are connected to form a second input terminal (Vin2), a voltage proportional to the input signal is applied to between the first and second input terminals, the third terminals (collectors, drains, and plates) of the first and third amplifier elements of at least three terminals are connected to form a first output terminal (Iout1), the third terminals of the second and fourth amplifier elements of at least three terminals are connected to form a second output terminal (Iout2), a current difference ($I_{E1}-I_{E2}$) proportional to the weight value is supplied to the first terminals of the first second differential amplifier circuits, whereby a current difference (Iout1−Iout2) proportional to the product of multiplying a positive or negative value and the result of processing the input signal by a bounded, monotonous function is produced at the first and second output terminals.

A specific example of the differential amplifier circuit of at least three terminals, constructed using bipolar transistors, is as shown in FIG. 15. As shown, the collectors of the transistors Q3 and Q5 are connected to each other, and the total collector current is Iout1. The collectors of the transistors Q4 and Q6 are connected to each other, and the total collector current is Iout2. The difference of the total currents is expressed by $$Iout1-Iout2=(I_{E1}-I_{E2})\cdot\tan h((Vin1-Vin2)/2V_T) \quad (8)$$

The circuit described above is the circuit constructed using the bipolar transistors. The circuit having the characteristics of the bounded, monotonous function and the multiplication, can be achieved by another 3-terminal amplifying elements of nonlinear characteristics, such as field effect transistors generally operating as balanced modulators, electron tubes having the remote cut-off characteristic, electron tubes having variable μ characteristics.

In the case where continuous values during the computing process are handled in the form of current or voltage, as described above, an error is generally caused. Some type of the error is influenced by disturbance. When real numbers are expressed in terms of voltage using a semiconductor electric circuit, the voltage is often varied by ambient temperature. A measure can be taken for such a disturbance by using means for measuring the quantity of disturbance. If a correcting means to reduce the influence by the disturbance, which is used depending on the quantity of disturbance, is known, the influence of the disturbance can be reduced by using that means. This can be applied to a circuit where the learning is performed and another circuit where the learning is not performed (to be described later).

Figure 18A:
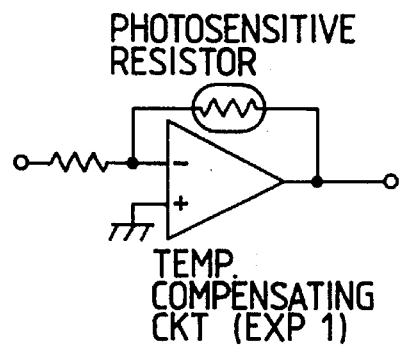
FIG. 18(a) is a circuit diagram showing a temperature compensating circuit constructed with the preamplifier.
Figure 18B:
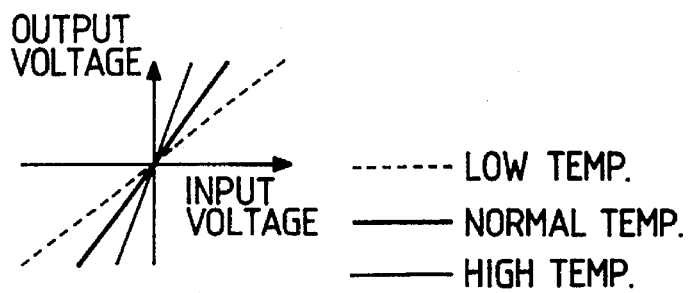
FIG. 18(b) is a graph showing the input-to-output voltage characteristic of the circuit shown in FIG. 18(a) with a parameter of the temperature.
Figure 18C:
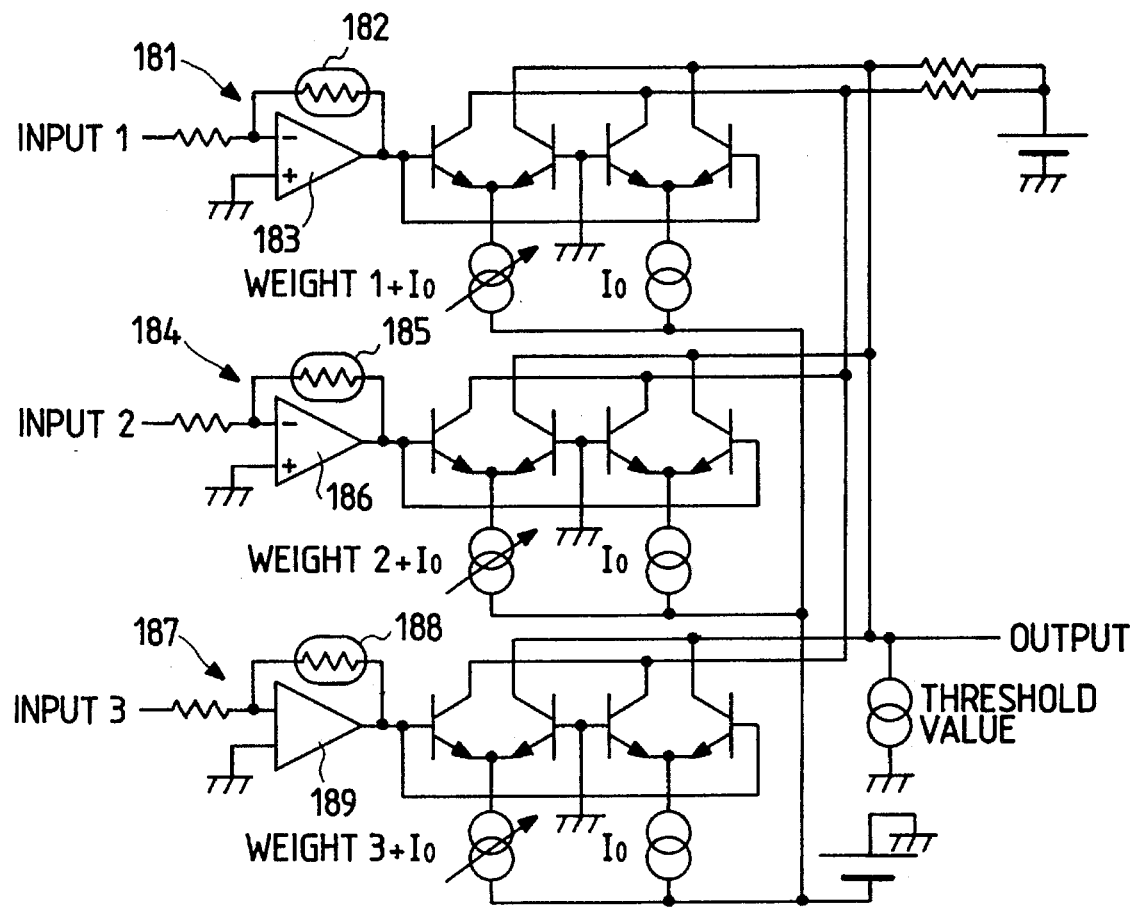
FIG. 18(c) is a circuit diagram showing the nonlinear operation unit of FIG. 16 including temperature compensating means.

The nonlinear operation unit of the invention comprises: first means (182, 185, 188 in FIG. 18) for detecting an intensity of disturbance; second means (183, 186, 189 in FIG. 18(c)), located at the inputs, for changing the weight values and threshold values so as to reduce the influence by the disturbance, in accordance with the disturbance intensity obtained by the first means.

Particularly when the disturbance is due to temperature, the quantity of the disturbance, i.e., temperature, is easy. And the influence by temperature can be predicted, and also be corrected.

The influence by temperature comes in two cases. In the first case, the influence by the disturbance is proportional to the absolute temperature. In the second case, it is inversely proportional to the absolute temperature. Let us consider a case where the nonlinear function f is inversely proportional to the absolute temperature, and it varies according to the following equation ft.

$$ft=f(t0/t)\cdot x) \quad (9)$$

where ft(x): actual function value of the function f(x) at absolute temperature t t0: reference temperature at which ft(x)=f(x) holds. The ft may be corrected by using a function "at" defining a variation of the amplification, which depends on temperature.

$$at(x)=(t/t0)\cdot x \quad (10)$$

Applying this function before the ft is applied, we have $$\begin{aligned} ft(at(x)) &= ft((t/t0)\cdot x) \quad (11)\\ &= f((t0/t)\cdot (t/t0)\cdot x)\\ &= f(x) \end{aligned}$$

In the construction using an electric circuit, the nonlinear circuit using bipolar transistors as shown in FIG. 18 sometimes has a temperature characteristic as defined by the ft. This can be corrected by an electric circuit, which operates according to the function at.

In the nonlinear operation unit of the invention, the first means may be detecting means (182, 185, 188 in FIG. 18(c)) for detecting absolute temperature. The second means may be multiplying means (183, 186, 189 in FIG. 18(c)) for multiplying the values proportional to the absolute temperature derived from the detecting means and the input values of the nonlinear function.

Figure 19A:
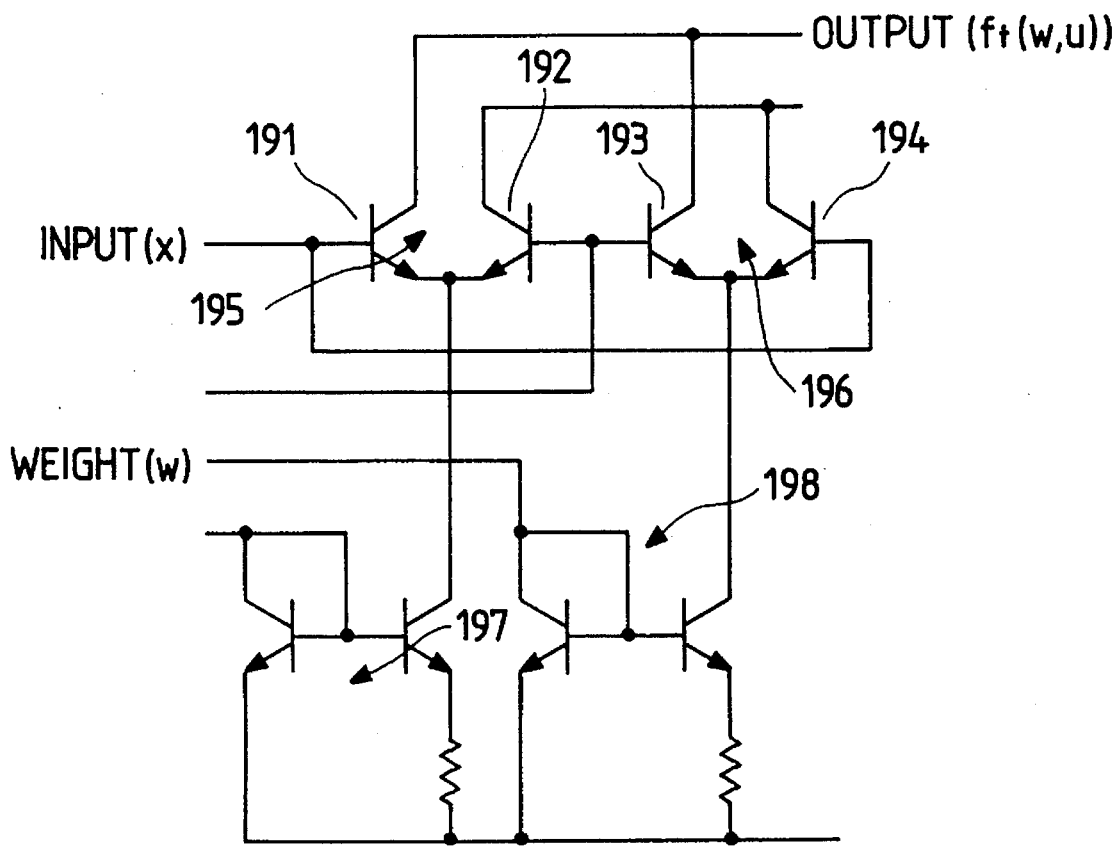
FIG. 19(a) is a circuit diagram showing a constituent element of the embodiment of the present invention, which additionally includes a circuit for modulating the weight in accordance with the absolute temperature of differential amplifier circuits.
Figure 19B:
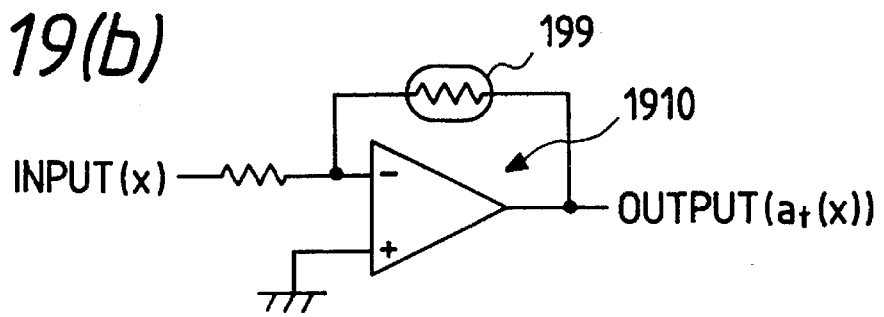
FIG. 19(b) is a circuit diagram showing an amplifier circuit of which the amplification factor is proportional to absolute temperature.
Figure 19C:
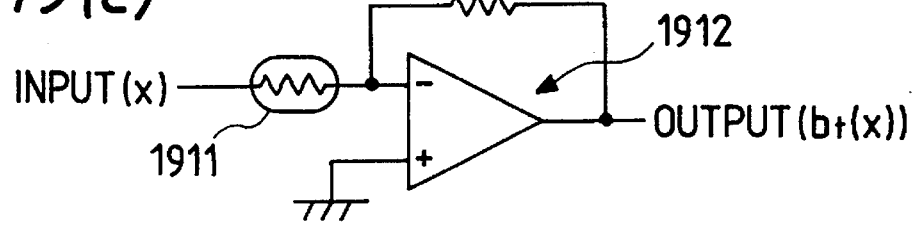
FIG. 19(c) is a circuit diagram showing an amplifier circuit of which the amplification factor is inversely proportional to absolute temperature.

A nonlinear unit for temperature compensation may comprise: detecting means (199 in FIG. 19(b)) for detecting absolute temperature; first multiplying means (1910 in FIG. 19(b), 191 and 192 in FIG. 19) for multiplying a value proportional to the absolute temperature obtained by the detecting means and an input signal externally applied; second multiplying means (197, 198 in FIG. 19(a)) for multiplying a value proportional to absolute temperature derived from the first multiplying means and each weight value, which is to be multiplied by the result of the operation by the nonlinear function operation means; and third multiplying means (FIG. 19(c), 194 in FIG. 19) for multiplying a value inversely proportional to the absolute value gained by the detecting means and an outputs signal applied to exterior.

In the data processing apparatus of the invention, as described above, a plural number of nonlinear operation units are connected (FIGS. 2, 6, 9, 10, and 11), and a desired function is achieved by properly setting the weight value and the threshold value.

In the data processing apparatus of the invention, each of the plural number of nonlinear operation units interconnected comprises: first and second differential amplifier circuits (195 and 196 in FIG. 19(a)); and weight multiplying circuits (197 and 198 in FIG. 19(a)) for supplying current signals each of a current difference proportional to a weight value to the first terminals of the first and second differential amplifier circuits, and for modulating the weight value by absolute temperature. Characteristic variations of the first and second differential amplifier circuits of the nonlinear function operation means in a first stage (206 in FIG. 22), cancel but as the result of a characteristic variation of the modulating circuit of the nonlinear function operation means located in a second stage preceding to the first stage.

Such a data processing apparatus may be constructed using means for detecting a difference between a desired output and an actual output, and means for automatically altering the weight value and the threshold value on the basis of the detected difference, by a back-propagation method. When the weight value and the threshold value are determined through the learning by the back-propagation process, in the neural network where the computing operation by the nonlinear function follows the normal product sum operation, differences each between each output and a teacher signal representative of a desired output are obtained, and the squares of the differences are added together. The resultant sum is used as energy. The energy is smaller as the difference between the output and the teacher signal is smaller. The energy is zero when all the outputs are equal to the teacher signals. The process in which the energy function is used and each weight value and each threshold value are altered so as to decrease the energy function, is known as the back-propagation.

Also in the network where the computing operation by the nonlinear function follows the normal product sum operation, the energy may be defined in a manner that the differences each between the internal potential of each neuron, which becomes the output signal, and a teacher signal are squared, and the squares of the differences are added together for all the outputs. The energy is the function of the weight and threshold values. The means during the computing process include the continuous function, multiplication, and addition. Therefore, the energy function can be differentiated, with variables of the weight and threshold values. The energy function can be decreased by altering the weight and threshold values so as to decrease the energy function, using the differentiated function.

FIG. 1 showing an arrangement of a nonlinear operation unit according to an embodiment of the present invention. The nonlinear operation unit, which performs the computing operation of the equation (4), nonlinear function operation sections $11a$ to $11n$ for computing the input signals by using the nonlinear function $g(uj)$, multiplier sections $12a$ to $12n$ for multiplying the function values produced by the nonlinear function operation sections $11a$ to $11n$ by a weight value $wji$, and an adder section 13 for adding together the results of the multiplying operations by the multiplier sections $12a$ to $12n$. The threshold value ($\theta i$) is set at 0 and a means for adding the threshold value is omitted.

$$ui=\Sigma j\{wji \cdot g(uj)\}+\theta i \quad (4)$$

The nonlinear function of the nonlinear function operation sections $11a$ to $11n$ may be a monotonous function of bounded type, such as a hyperbolic tangent function as a logistic function.

The nonlinear operation unit may be realized by an analog electronic circuit, a digital electronic circuit, or the combination of a digital computer and a program.

A desired data processor may be constructed by combining a plural number of nonlinear operation units, and by properly selecting a nonlinear function and properly setting a weight value.

Figure 2:
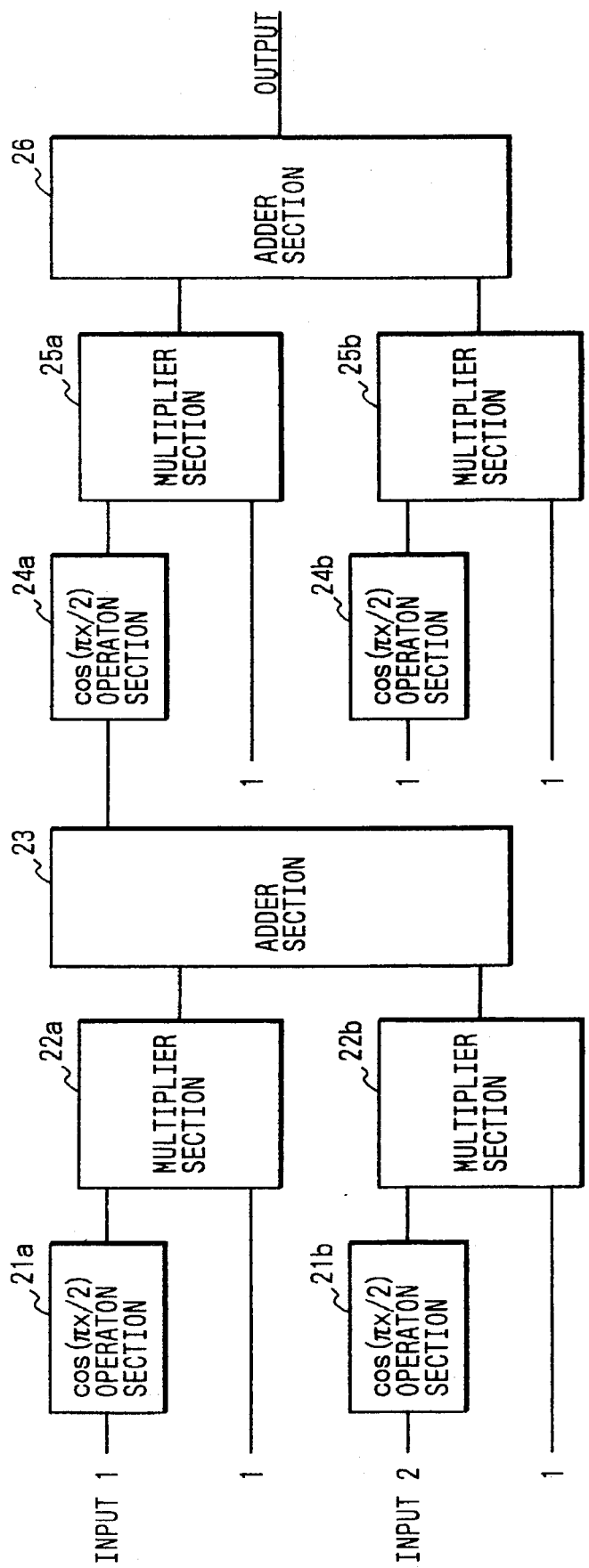
FIG. 2 is a block diagram showing an arrangement with the function of an exclusive OR, which is the combination of two nonlinear operation units shown in FIG. 1.

An example of this is shown in FIG. 2. In the example, the two nonlinear operation units shown in FIG. 1 are combined to perform an exclusive OR operation shown in Table 1 using two input signals.

TABLE 1

| INPUT 1 | INPUT 2 | OUTPUT |
|---------|---------|--------|
| 0 | 0 | 0 |
| 0 | 1 | 1 |
| 1 | 0 | 1 |
| 1 | 1 | 0 |

Two nonlinear operation units are combined into a circuit as shown in FIG. 2. The circuit has two inputs. The nonlinear functions are each $\cos(\pi x/2)$. The weight value used for each multiplication is 1. The output signal of the circuit is the result of exclusively ORing the input signals. In this instance, these two units have the same constructions. Because of this, the combination of the units is easy. It is evident that in combining the nonlinear operation units, there is no need of using the same functions, the equal weight values, and the same units.

Figure 3:
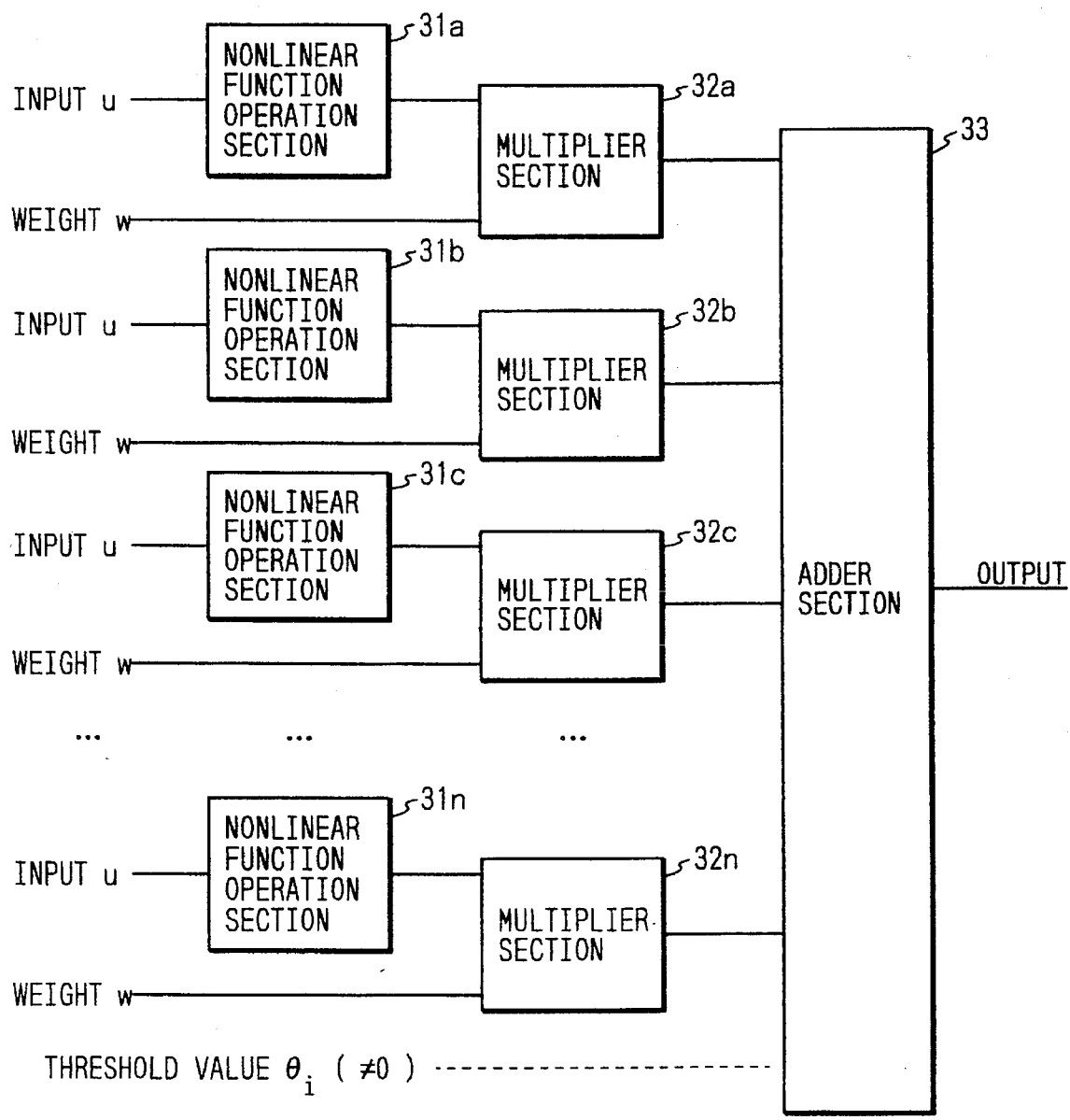
FIG. 3 is a block diagram showing a nonlinear operation unit according to another embodiment of the present invention.

FIG. 3 is a block diagram showing an arrangement of a nonlinear operation unit according to another embodiment of the present invention. The nonlinear operation unit of this embodiment performs the operation of the equation (4). The construction of this embodiment is the same as that of the nonlinear operation unit of FIG. 1 except that an adder section 33 additionally includes a means for adding the threshold value $\theta i$ to the sum of the multiplication results. In the nonlinear operation unit of this embodiment, the input signals are computed by using the nonlinear functions in the multiplier sections $32a$ to $32n$. The results are multiplied by the weight values in the multiplier sections $32a$ to $32n$. The products from the multiplier sections and the threshold value are added together in the adder section 33. In this way, the input signals are converted into an output signal.

Figure 4:
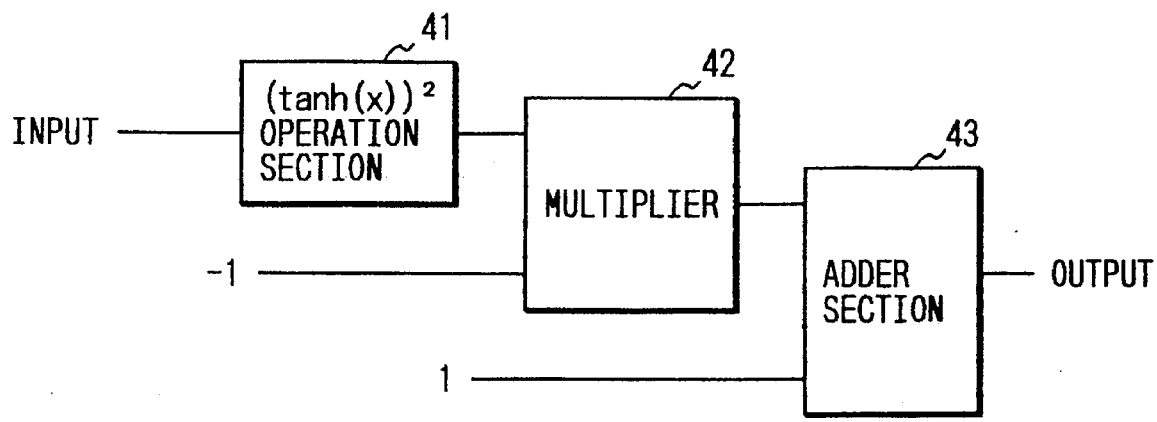
FIG. 4 is a block diagram showing a circuit, constructed with one nonlinear operation unit of FIG. 3, for obtaining the derivative of a hyperbolic tangent function.

FIG. 4 is a block diagram showing a circuit, constructed with one nonlinear operation unit of FIG. 3, for obtaining the derivative of a hyperbolic tangent function. The hyperbolic tangent function $\tan'(x)$ is given by $$\tanh'(x)=1-(\tanh(x)) \quad (12)$$

In this circuit, the nonlinear function is $(\tanh(x))^2$. The output signal from the $(\tanh(x))^2$ operation unit 41 is multiplied by a weight value of $-1$ in the multiplier 42. A threshold value of 1 is added to the product from the multiplier 42. The output signal of the circuit is the derivative of the hyperbolic tangent function.

FIG. 5 is a block diagram showing a nonlinear operation unit for performing the operation of the equation (6) already referred to. This nonlinear operation unit includes function operation sections $51a$ to $51n$ each for performing the computing operation of a function $f(w, u)$, which produces the operation results equivalent to the products of multiplying the function values, which are obtained by computing the input signals u by using the nonlinear function $g(uj)$, by weight values $wji$, and an adder section 52 for summing the results of the operations by the function operation sections $51a$ to $51n$. In the nonlinear operation unit, $\theta i$ is 0, and a means for adding it is omitted.

$$ui=\Sigma j\{f(wji, uj)\}+fi \quad (6)$$

The input signals u are computed by using the function $f(w, u)$, which produces the operation results equivalent to the product of multiplying the results of computing the input signals u by using the nonlinear function, by the weight values, so that input signals are converted into an output signal.

Figure 6:
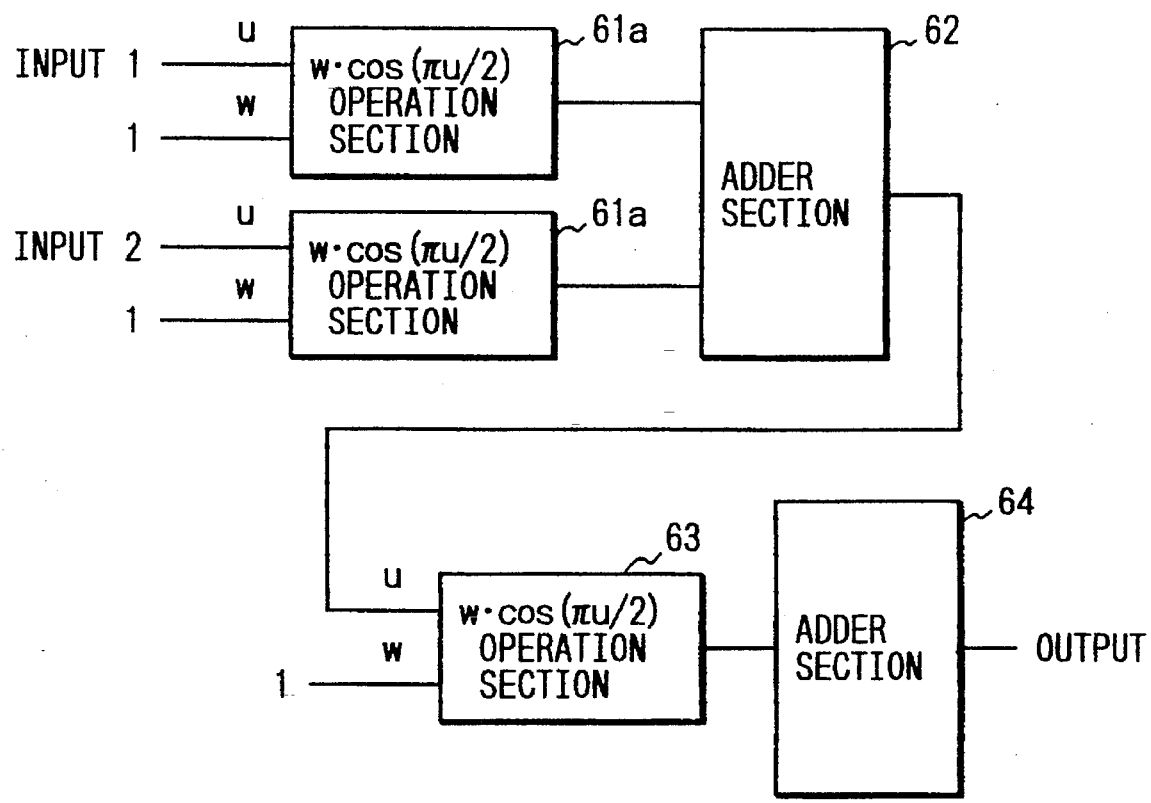
FIG. 6 is a block diagram showing a circuit, constructed with two nonlinear operation units of FIG. 5, for performing an exclusive OR operation.

FIG. 6 is a block diagram showing a circuit, constructed with two nonlinear operation units of FIG. 5, for performing an exclusive OR operation. As shown, the circuit has two inputs. The function f for each input is defined as follows:

$$f(w, u)=w\cos(\pi u/2) \quad (13)$$

In this embodiment, nonlinear operation units receiving the two input signals of the same nonlinear function and a nonlinear operation unit receiving one input signal are arranged as shown. The output signal produced from the circuit is the result of exclusively ORing the input signals.

Figure 7:
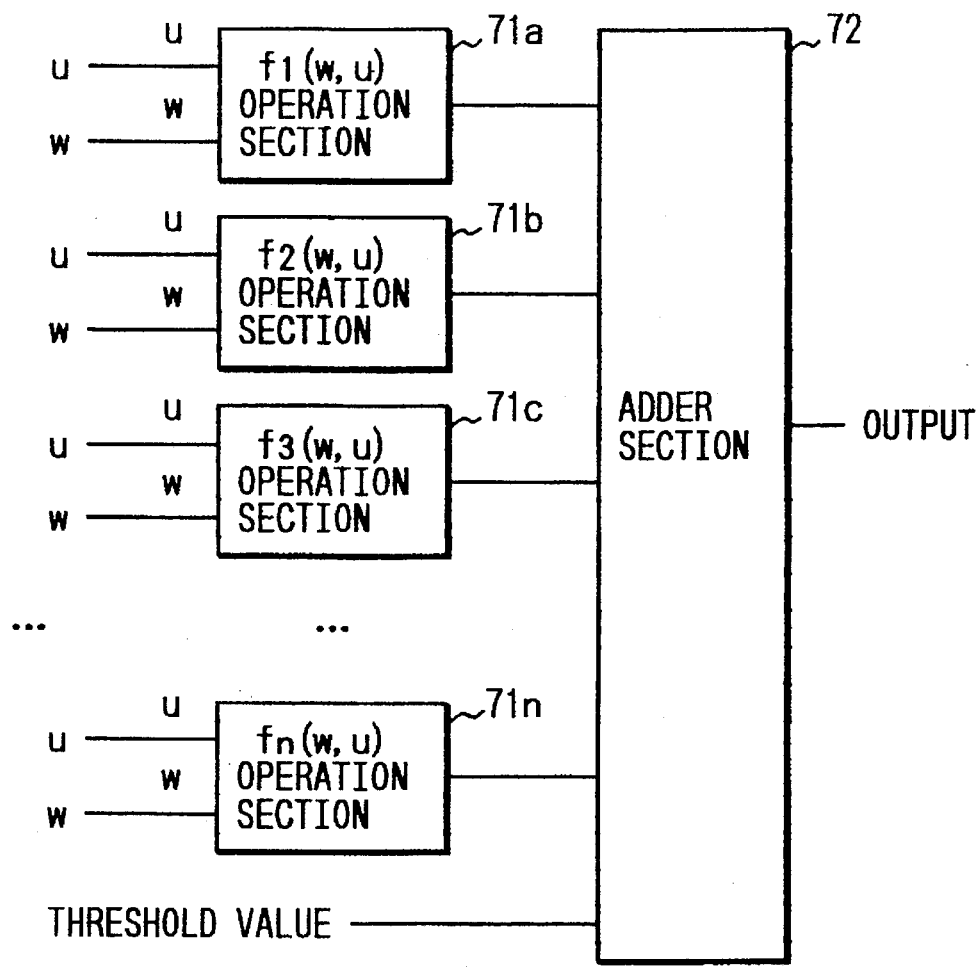
FIG. 7 is a block diagram showing another nonlinear operation unit for performing the equation (4)

The embodiment shown in FIG. 7 is an nonlinear operation unit, which performs the operation of the equation (4), and is different from the nonlinear operation unit shown in FIG. 5 in that a means for adding the threshold $\theta i$ is additionally provided in an adder section 72. The input signals are computed by using nonlinear functions, and the results of the computation are multiplied by a weight of a proper value. The products of the multiplication are added to the threshold value. In this way, the input signals are converted into an output signal.

Figure 8:
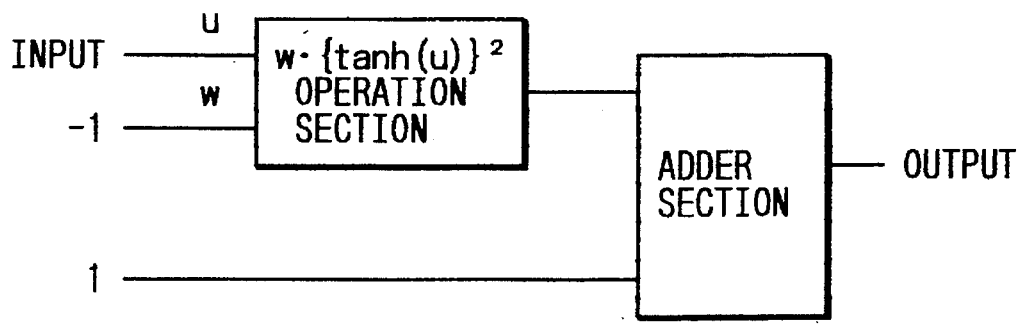
FIG. 8 is a block diagram showing a circuit, constructed with one nonlinear operation unit of FIG. 7, for obtaining the derivative of a hyperbolic tangent function.

FIG. 8 is a block diagram showing a circuit, constructed with one nonlinear operation unit of FIG. 7, for obtaining the derivative of a hyperbolic tangent function. In this embodiment, the function f is defined as follows:

$$f(w, u) = w \cdot \{\tan h(u)\}^2 \quad (14)$$

By setting the threshold value to "1", the derivative of the hyperbolic function of the input is produced.

Figure 9:
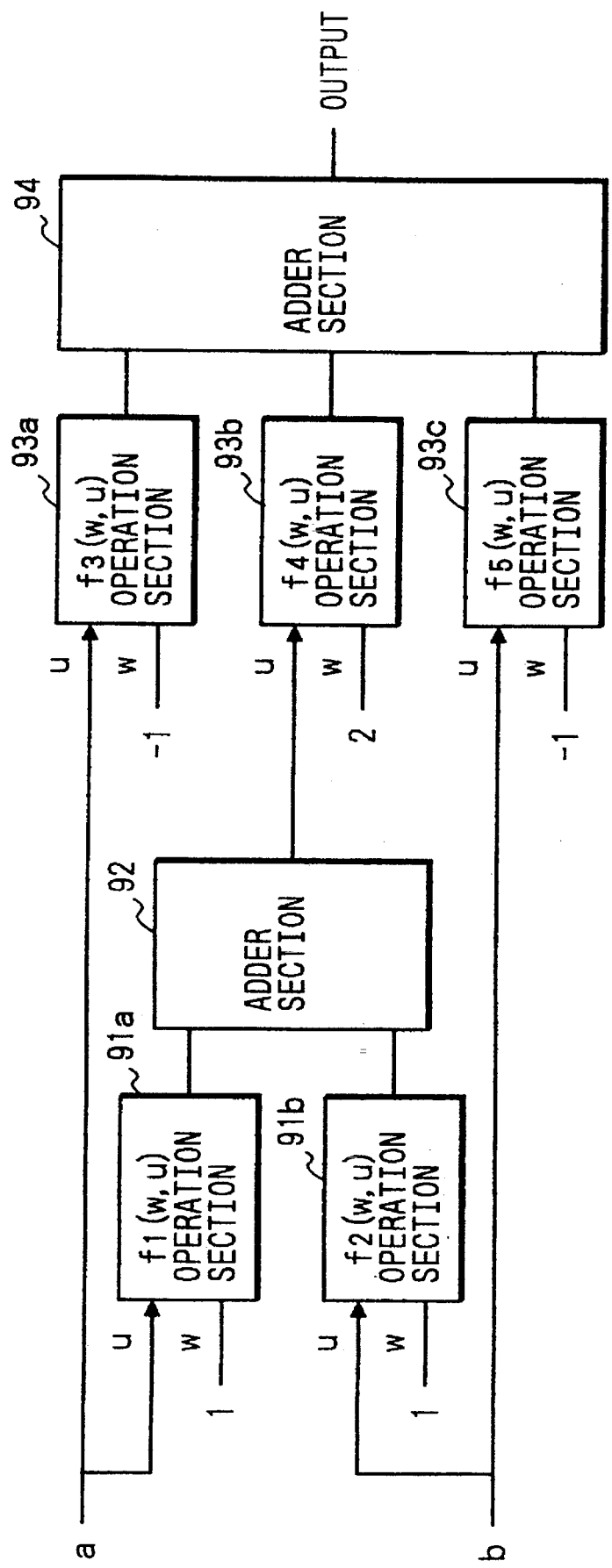
FIG. 9 is a block diagram showing an exclusive OR circuit using two nonlinear operation units shown in FIG. 5, in which all the values during the computing process are real numbers and the nonlinear function includes a monotonous function of bounded type.

FIG. 9 is a block diagram showing an exclusive OR circuit using two nonlinear operation units shown in FIG. 5, in which all the values during the computing process are real numbers and the nonlinear function includes a monotonous function of bounded type. The monotonous function g of bounded type is given $$g(x)=0(x<0) \; g(x)=x(0 \leq x \leq 1) \; g(x)=i(1<x) \quad (15)$$

Using the function, f1, f2, f3, f4, and f5 are defined as follows:

$$f1(w, u) = w \cdot g(u) \; f2 = f3 = f4 = f5 = f1 \quad (16)$$

The weights are set as shown. With this construction, inputs a and b are exclusively ORed as shown Table 1.

Figure 10:
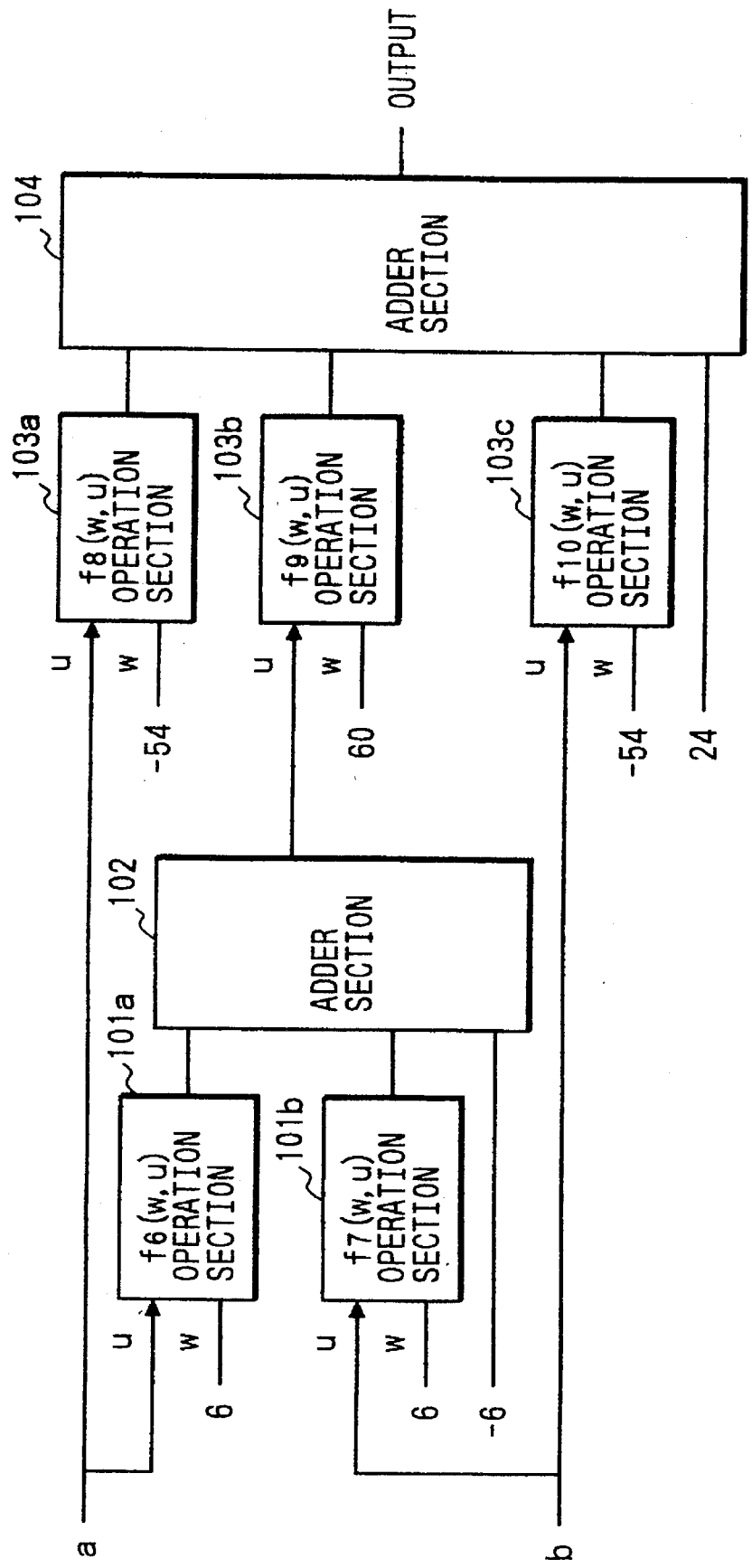
FIG. 10 is a block diagram showing an exclusive OR circuit using two nonlinear operation units shown in FIG. 7, in which all the values during the computing process are real numbers and the nonlinear function includes a logistic function as a monotonous function of bounded type.

FIG. 10 is a block diagram showing an exclusive OR circuit using two nonlinear operation units shown in FIG. 7, in which all the values during the computing process are real numbers and the nonlinear function includes a logistic function as a monotonous function of bounded type. The logistic function is $$g1(x) = 1/(1+2^{-x}) \quad (17)$$

Using the function, the functions f6, f7, f8, f9, and f10 are defined as follows:

$$f6(w, u) = w \cdot g1(u) \; f6 = f8 = f9 = f10 = f5 \quad (18)$$

The weights and threshold values are set as shown. With this construction, inputs a and b are exclusively ORed as shown Table 1.

Figure 11:
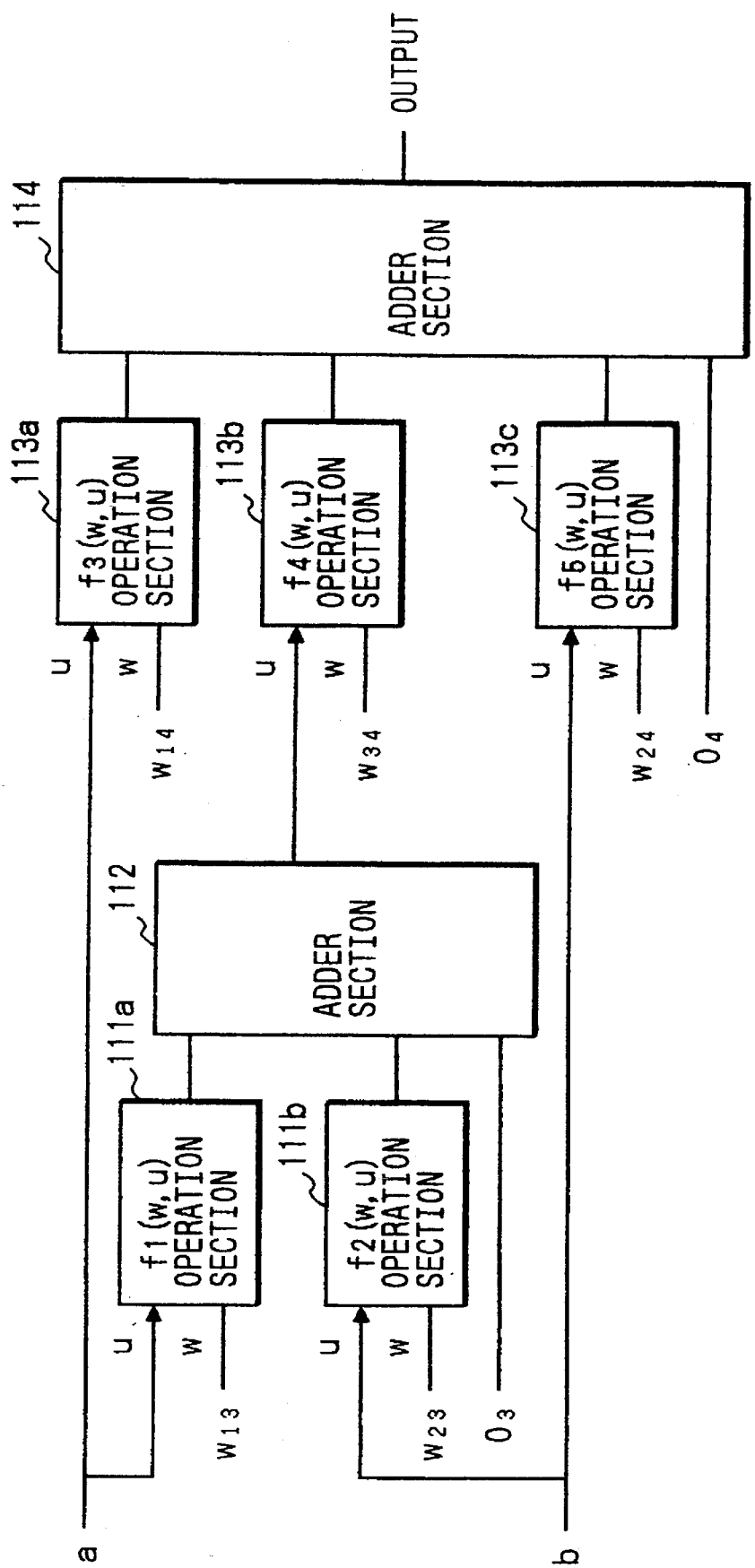
FIG. 11 is a block diagram showing a general binary function operation unit using two nonlinear operation units shown in FIG. 7, in which the weights and threshold values may be properly set.

FIG. 11 is a block diagram showing a general binary function operation unit using two nonlinear operation units shown in FIG. 7, in which the weights and threshold values may be properly set. The nonlinear function is the monotonous function of bounded type of the equation (12). The functions f1, f2, f3, f4, and f5 are defined as in the equation (13). Using those functions, the circuit is arranged as shown in FIG. 11. By altering the weights and the threshold values, a binary function with two-input/one output shown in Table 2 is realized. A desired input/output relation can be obtained by the weight and threshold value according to the table.

TABLE 2

| FUNCTION | OUTPUTS FOR INPUTS | | | | WEIGHT & THRESHOLD | | | | | | |
|---|---|---|---|---|---|---|---|---|---|---|---|
| | a=0, b=0 | a=0, b=1 | a=1, b=0 | a=1, b=1 | $W_{13}$ | $W_{14}$ | $W_{23}$ | $W_{24}$ | $W_{34}$ | $\delta_3$ | $\delta_4$ |
| (0) | 0 | 0 | 0 | 0 | 0 | 0 | 0 | 0 | 0 | 0 | 0 |
| ∧ | 0 | 0 | 0 | 1 | 1 | 1 | 1 | 1 | −1 | 0 | 0 |
|  | 0 | 0 | 1 | 0 | 1 | 1 | −1 | −1 | −1 | 1 | 1 |
| (x) | 0 | 0 | 1 | 1 | 0 | 1 | 0 | 0 | 0 | 0 | 0 |
|  | 0 | 1 | 0 | 0 | −1 | −1 | 1 | 1 | −1 | 1 | 1 |
| (y) | 0 | 1 | 0 | 1 | 0 | 0 | 0 | 1 | 0 | 0 | 0 |
| xor | 0 | 1 | 1 | 0 | 1 | −1 | 1 | −1 | 2 | 0 | 0 |
| Y | 0 | 1 | 1 | 1 | 1 | 0 | 1 | 0 | 1 | 0 | 0 |
| ¬Y | 1 | 0 | 0 | 0 | 1 | 0 | 1 | 0 | −1 | 0 | 1 |
| ¬xor | 1 | 0 | 0 | 1 | 1 | 1 | 1 | 1 | −2 | 0 | 1 |
| (¬y) | 1 | 0 | 1 | 0 | 0 | 0 | 0 | −1 | 0 | 0 | 1 |
|  | 1 | 0 | 1 | 1 | −1 | 1 | 1 | −1 | 1 | 1 | 0 |
| (¬x) | 1 | 1 | 0 | 0 | 0 | −1 | 0 | 0 | 0 | 0 | 1 |
|  | 1 | 1 | 0 | 1 | 1 | −1 | −1 | 1 | 1 | 1 | 0 |
| ¬∧ | 1 | 1 | 1 | 0 | 1 | −1 | 1 | −1 | 1 | 0 | 1 |
| (1) | 1 | 1 | 1 | 1 | 0 | 0 | 0 | 0 | 0 | 0 | 1 |

Figure 12:
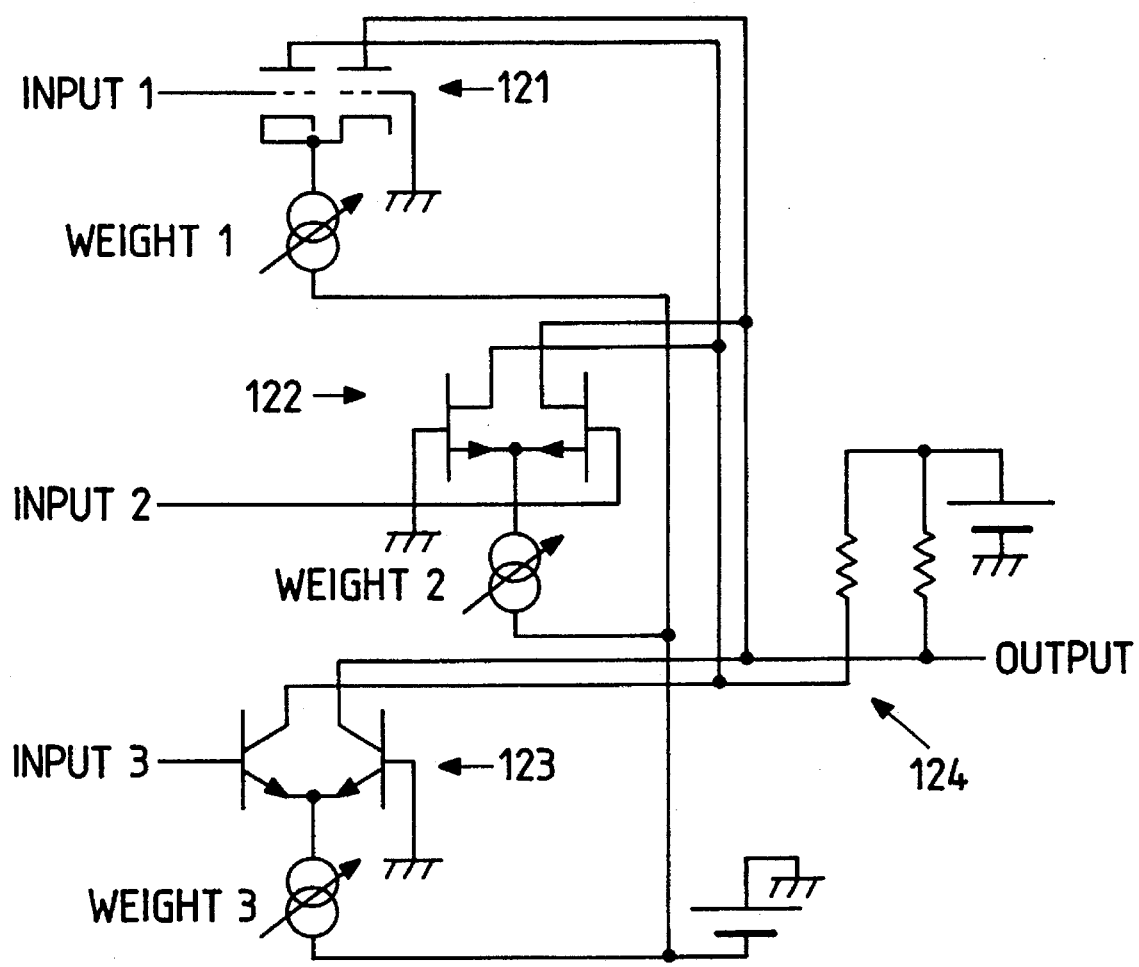
FIG. 12 is a circuit diagram of the nonlinear operation unit shown in FIG. 7 constructed using three terminal amplifier elements, such as electron tubes, junction type field effect transistors, and bipolar transistors.

FIG. 12 is a circuit diagram of the nonlinear operation unit of FIG. 7 constructed using 3-terminal amplifier elements, such as electron tubes, junction type field effect transistors, and bipolar transistors. As shown, the circuit with both the bounded, monotonous function and the multiplying function is realized by using differential amplifier circuits using the electron tubes, junction type field effect transistors, and bipolar transistors.

As shown, this circuit includes three differential amplifier circuits 121, 122 and 123 each consisting of a pair of three-terminal amplifier elements being connected such that the first terminals (emitter, source or cathode) are interconnected. Differential potentials proportional to the input signal are input to between the second terminals (base, gate and grid). Currents, proportional to the weights, are input to the first terminals (emitter, source and cathode) of the amplifying element. The third terminals (collector, drain and plate) of the 3-terminal amplifier elements respectively constituting the differential amplifier circuits 121, 122 and 123 provide the output signals of nonlinear functions, respectively. The Output signals of the differential amplifier circuits 121, 122 and 123 are added together by a current adder circuit 124, and output as the output signal of this nonlinear operation unit. In the illustration of the embodiment, the electron tube is a triode, but may be a pentode in lieu of the triode. The weights 1 and 3 are positive value and the weight 2 is a positive value.

A nonlinear function operation section using bipolar transistors will be described. In the bipolar transistor, the collector current $I_C$ flowing into the collector is mathematically expressed by the following equation $$I_C = I_S \cdot \exp(V_{BE}/V_T) \quad (19)$$

where $V_T = k \cdot T/q$ k: Boltzmann constant

T: absolute temperature q: electron charge

Is: reverse saturation current

Figure 13A:
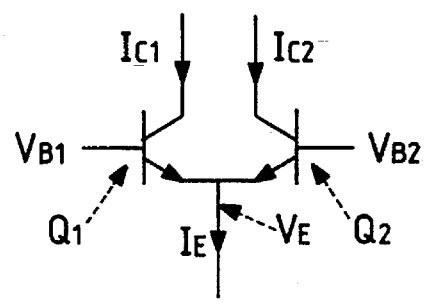
FIG. 13(a) is a circuit diagram showing a nonlinear function operation circuit realized by a differential amplifier constructed using bipolar transistors.

The reverse saturation current is a value proper to each transistor. Within the same integrated circuit, it is proportional to the emitter area. Therefore, it can be controlled by controlling the emitter area. The absolute temperature is the temperature of the junction pat of the element. The adjacent transistors within the same integrated circuit have approximately equal absolute temperature. In the circuit to follow, it is assumed that the transistors are equal in the reverse saturation current and the absolute temperature, and those current and temperature are represented by Is and T, respectively. The current amplification factor ($I_C/I_B$) is generally large, and then it is assumed that $I_B$ is 0 unless otherwise referred to, and that the collector current $I_C$ and the emitter current $I_E$ are equal. When bipolar transistors Q1 and Q2 are connected as shown in FIG. 13(a), the collector current $I_{C1}$ and $I_{C2}$, as well known, are given by the following equation $$I_{C1} = Is \cdot \exp((V_{B1} - V_E)/V_T) \quad I_{C2} = Is \cdot \exp((V_{B2} - V_E)/V_T) \quad (20)$$

where $V_{B1}$: base potential of the transistor Q1

$V_{B2}$: base potential of the transistor Q1

$V_E$: emitter potential of the transistors Q1 and Q2

Assuming that the total emitter current of both transistors is $I_E$, and arranging the above equations for the current difference, then we have $$I_{C1} - I_{C2} = I_E \cdot (\exp((V_{B1} - V_{B2})/2V_T) - 1)/(\exp((V_{B1} - V_{B2})/2V_T) + 1) \quad (21)$$

The hyperbolic tangent function is defined by the following equation:

$$\tanh(x) = (\exp(x/2) - 1)/(\exp(x/2) + 1) \quad (22)$$

Rearranging the equation (21) using the above hyperbolic tangent function, we have $$I_{C1} - I_{C2} = I_E \cdot \tanh((V_{B1} - V_{B2})/2V_T) \quad (23)$$

Figure 13B:
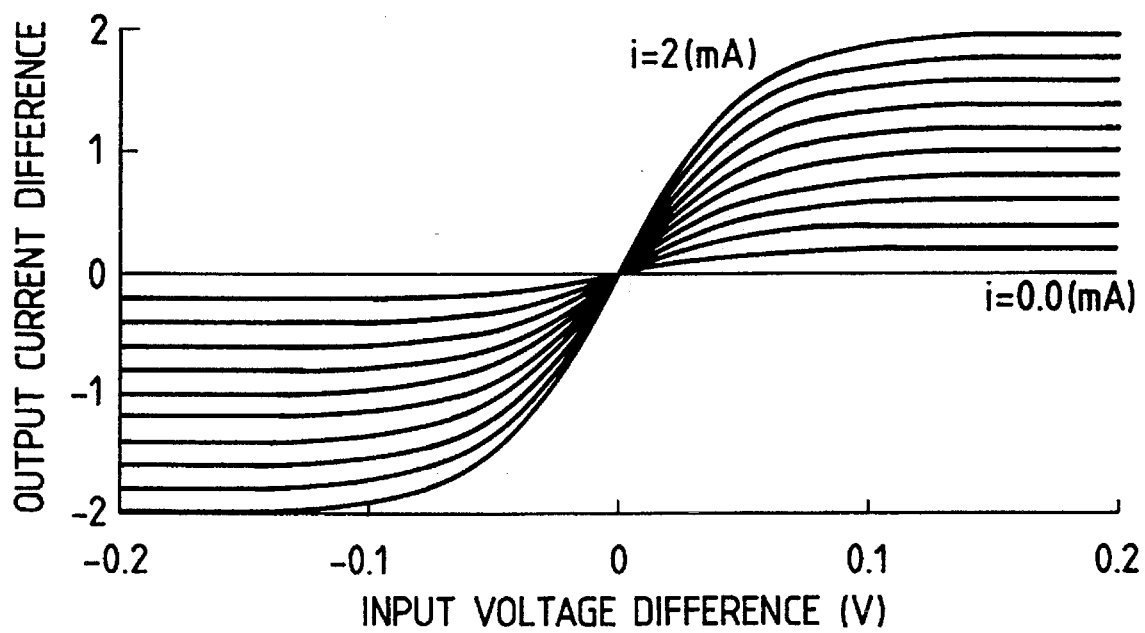
FIG. 13(b) is a graph showing the characteristic of the differential amplifier of FIG. 13(a)

This circuit can produce a current difference proportional to the product of multiplying a function value that is obtained by applying a hyperbolic tangent function as a logistic function to the input voltage difference by the emitter total current $I_E$. As seen from the equation (23), when the reverse saturation currents of the two transistors are equal to each other, the circuit is not influenced by the reverse saturation currents. In the analog integrated circuit, it is difficult to set the reverse saturation currents of the transistors to preset values, but it is relatively easy to set the characteristics of the two transistors to the same ones. It is for this reason that this circuit (differential amplifier) is used. The results of the circuit by using an analog circuit simulation circuit are shown in FIG. 13(b). FIG. 13(b) illustrates the input/output relation of the circuit under the condition that the current i is varied from 0.0 mA to 2.0 mA in the step of 0.2 mA at 300° K. (27° C.). At this time, the thermal voltage is approximately 26 mV. In this circuit, i≧0.

Figure 14:
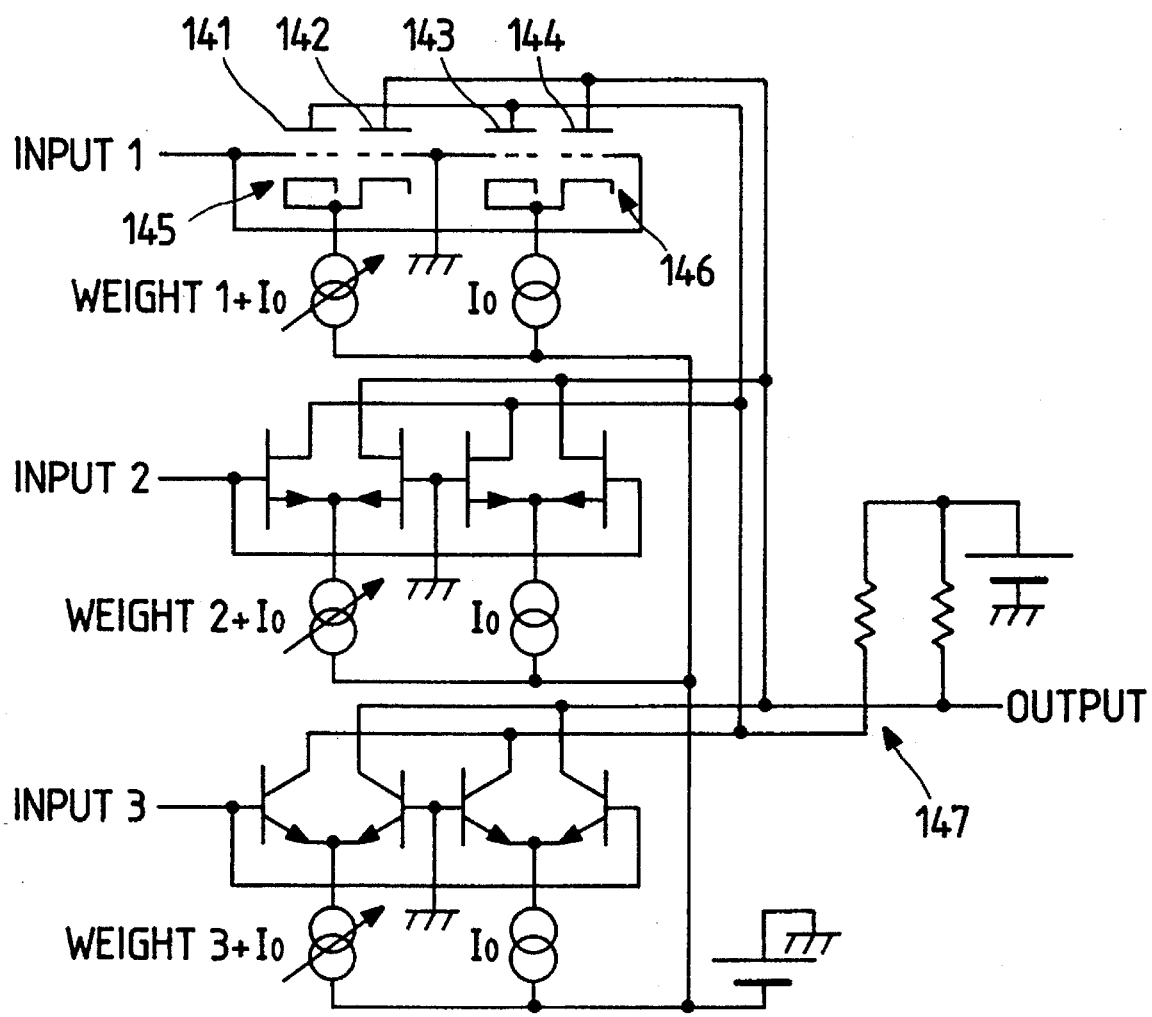
FIG. 14 is a circuit diagram of the nonlinear operation unit shown in FIG. 7 constructed using three terminal amplifier elements, such as electron tubes, junction type field effect transistors, and bipolar transistors.

FIG. 14 is a circuit diagram of the nonlinear operation unit shown in FIG. 7 constructed using three terminal amplifier elements, such as electron tubes, junction type field effect transistors, and bipolar transistors. As shown, a bounded, monotonous function and a multiplier are constructed using electron tubes, junction type field effect transistors, and bipolar transistors.

This unit includes three nonlinear function operation circuits, and the output signals of those circuits are added together by a current adder circuit. In each nonlinear function operation circuit, first and second 3-terminal amplifier elements 141 and 142 are interconnected at the first terminals (emitter, source, and cathode), thereby forming a first differential Amplifier circuit 145. Third and fourth 3-terminal amplifier elements 143 and 144 are interconnected at the first terminals (emitter, source and cathode), thereby forming a second differential amplifier circuit 146. The first and fourth 3-terminal amplifier elements 141 and 144 are interconnected at the second terminals (base, gate, and grid), thereby forming a first input terminal. The second and third 3-terminal amplifier elements 142 and 143 are interconnected at the second terminals (base, gate, and grid), thereby forming a second input terminal. A voltage proportional to the input signal is supplied to the first and second input terminals. The first and third 3-terminal amplifier elements 141 and 143 are connected at the third terminal (collector, drain, and plate), thereby forming a first output terminal. The second and fourth 3-terminal amplifier elements are connected at the third terminal (collector, drain, and plate), thereby forming a second output terminal. Currents of a current difference proportional to a weight value are fed to the first terminals (emitter, source, and cathode) of the first and second differential amplifier circuits, thereby applying the bounded, monotonous function to the input signals. As a result, the current differences proportional to the products of them by a negative or positive value appear at the first and second output terminals.

The nonlinear function operation section constructed with bipolar transistors as 3-terminal amplifier elements will be described. The circuit of this section is arranged as shown in FIG. 15. Use of two differential amplifier circuits 151 and shown, a nonlinear function circuit of four quadrants which may take a positive or negative value can be realized.

This circuit is constructed with four bipolar transistors Q3, Q4, Q5 and Q6 of which the reverse saturation currents are equal. The collector currents $I_{C3}$, $I_{C4}$, $I_{C5}$, and $I_{C6}$ of the transistors are given by the following equations $$I_{C3} = I_s \cdot \exp((Vin1 - V_{E1})/V_T)$$

$$I_{C4} = I_s \cdot \exp((Vin2 - V_{E1})/V_T)$$

$$I_{C5} = I_s \cdot \exp((Vin2 - V_{E2})/V_T)$$

$$I_{C6} = I_s \cdot \exp((Vin1 - V_{E2})/V_T) \quad (24)$$

where

V1n1, V1n2: potential at the input terminal $V_{E1}$: potential at the emitters of the transistors Q3 and Q4

$V_{E2}$: potential at the emitters of the transistors Q5 and Q6

Assuming that the total emitter current of the transistors Q3 and Q4 is $I_{E1}$ and the total emitter current of the transistors Q5 and Q6 is $I_{E2}$, and arranging the above equations for the current difference, then we have $$I_{C3} - I_{C4} = I_{E1} \cdot \tanh((Vin1 - Vin2)/2V_T)$$

$$I_{C5} - I_{C6} = I_{E2} \cdot \tanh((Vin2 - Vin1)/2V_T) \quad (25)$$

Figure 15A:
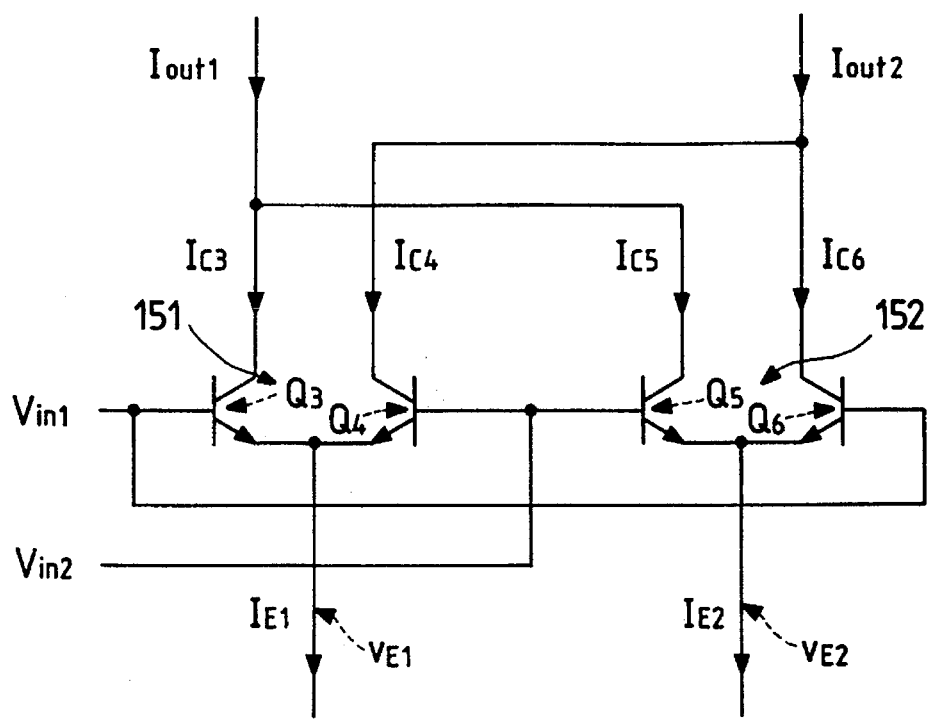
FIG. 15(a) is a circuit diagram showing a nonlinear function operation circuit realized by combining two differential amplifiers constructed using bipolar transistors.

As shown in FIG. 15(a), the collectors of the transistors Q3 and Q5 are connected to each other, and the total collector current is Iout1. The collectors of the transistors Q4 and Q6 are connected to each other, and the total collector current is Iout2. The difference of the total currents is expressed by $$\text{Iout1} - \text{Iout2} = (I_{E1} - I_{E2}) \cdot \tanh((\text{Vin1} - \text{Vin2})/2V_T) \quad (26)$$

Figure 15B:
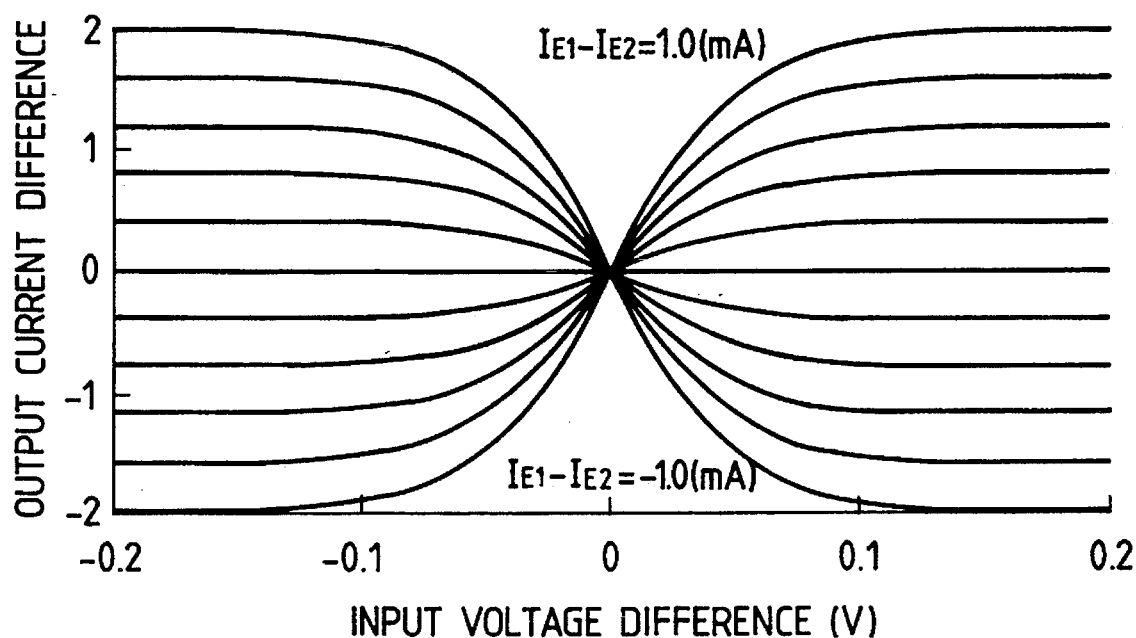
FIG. 15(b) is a graph showing the characteristic of the differential amplifier of FIG. 15(a)

Also in this circuit, the signs of the total emitter currents $I_{E1}$ and $I_{E2}$ cannot be changed, but the sign of the difference of the total emitter currents can be changed. This circuit, generally called a multiplier core, is widely used for the analog circuits, such as VTR, and some of logic circuits. The results of simulating this circuit by an analog simulation circuit are shown in FIG. 15(b). The figure illustrates the input/output relation of the circuit under the condition that the current ic1–ic2 is varied from −1.0 mA to +1.0 mA in the step of 0.2 mA at 300° K. (27° C.).

The instance described above is the circuit constructed using the bipolar transistors. The circuit having the characteristics of the bounded, monotonous function and the multiplication, can be achieved by another 3-terminal amplifying elements of nonlinear characteristics, such as field effect transistors generally operating as balanced modulators, electron tubes having the remote cut-off characteristic, electron tubes having variable μ characteristics.

Figure 16:
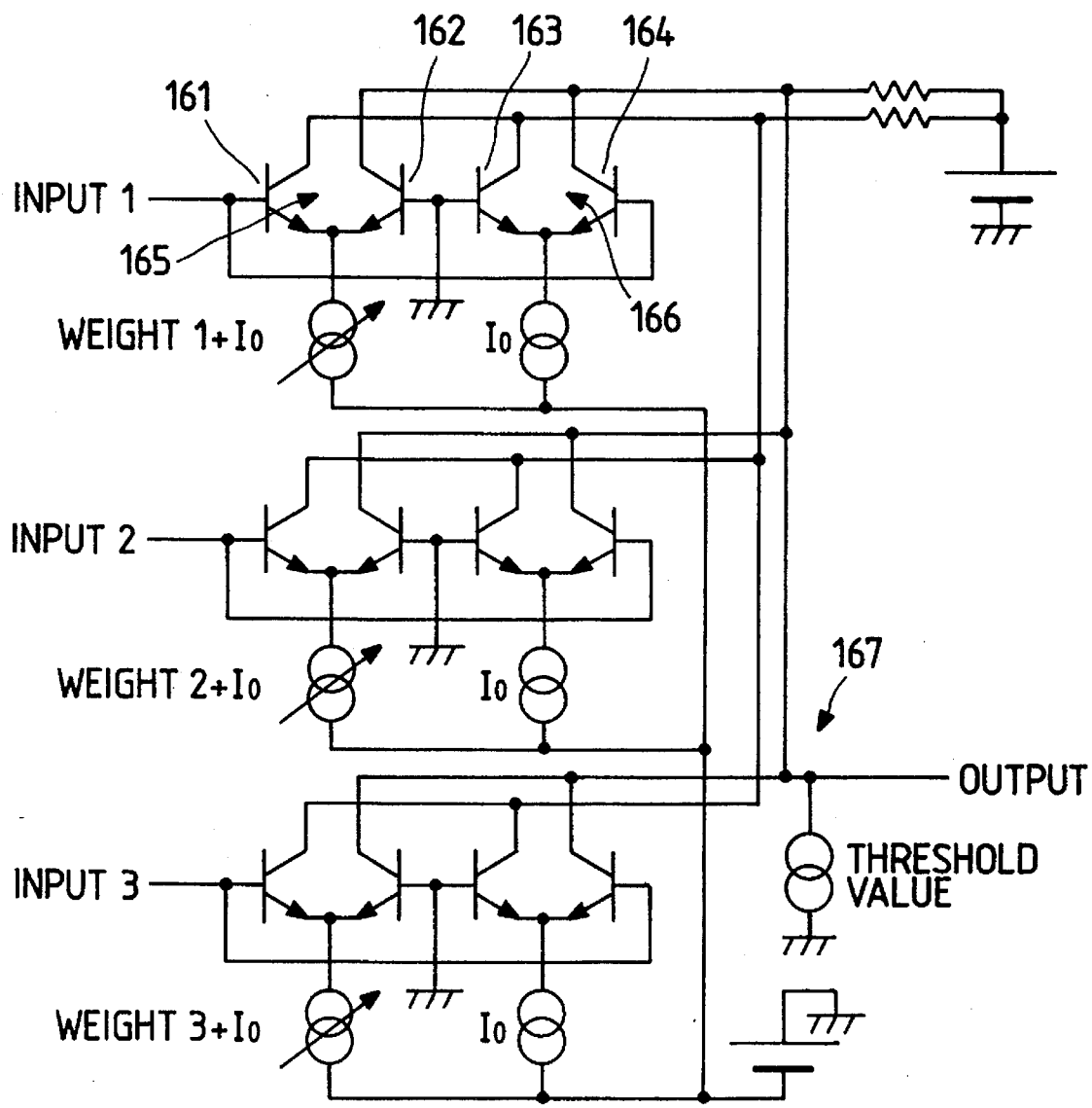
FIG. 16 is a circuit diagram showing a nonlinear operation unit constructed using three nonlinear function operation circuits of FIG. 15(a)

FIG. 16 is a circuit diagram showing a nonlinear operation unit constructed using three nonlinear function operation circuits of FIG. 15(a). Each nonlinear function operation circuit is a nonlinear operation unit for performing the operation of the hyperbolic tangent function and the multiplication, viz., a sigmoid synapsis circuit.

The nonlinear operation unit includes eight nonlinear function operation circuits and a current adder circuit 167 for adding together the output signals of those nonlinear function operation circuits. Each nonlinear function operation circuit includes a first differential amplifier circuit 165 in which first and second bipolar transistors 161 and 162 are connected at the emitters, and a second differential amplifier circuit 166 in which third and fourth bipolar transistors 163 and 164 are connected at the emitters. In the nonlinear function operation circuit, the bases of the first and fourth bipolar transistors 161 and 164 are connected to form a first input terminal. The bases of the second and third bipolar transistors 162 and 163 are connected to form a second input terminal. A voltage proportional to the input signal is applied to between the first and second input terminals. The collectors of the first and third bipolar transistors 161 and 163 are connected to form a first output terminal. The collectors of the second and fourth bipolar transistors 162 and 164 are connected to form a second output terminal. Current of a current difference proportional to a weight value is supplied to the emitter of the second differential amplifier circuit. With such an arrangement, the input signals are processed by the hyperbolic tangent functions as the bounded, monotonous functions. The results of the processing are multiplied by positive or negative values. A current difference proportional to each product appears at the first and second output terminals. The output signals and a threshold value are added together by the current adder circuit 167. The result of the addition is output as an output signal of the nonlinear operation unit.

As described above, when the bipolar transistors are used, the characteristics of the hyperbolic tangent function and the multiplication are obtained. In this circuit, the amplification factor varies depending on temperature since the mathematical expression of the characteristics of the circuit contains a term describing absolute temperature.

Rearranging the equation describing the characteristic of the balanced modulator, for absolute temperature T, then we have $$\text{Iout1} - \text{Iout2} = (I_{E1} - I_{E2}) \cdot \tanh((1/2) \cdot q \cdot (\text{Vin1} - \text{Vin2})/kT) \quad (27)$$

As seen from the above equation, a sensitivity to the input voltage difference is inversely proportional to the absolute temperature. As seen from FIG. 17, a temperature characteristic curve of this circuit is gentle at high temperature and steep at low temperature. The inclination of the characteristic curve, when the input voltage difference is 0, is inversely proportional to absolute temperature. Even if the circuit has such a characteristic, the characteristic, in most cases, can be automatically corrected through the back-propagation basis Learning. Where no learning is carried out or when temperature varies after the back-propagation basis learning is completed, some temperature compensating measure must be taken.

In one of possible ways for compensating for the temperature characteristic, circuits which detects an absolute temperature of the circuit of the nonlinear operation unit and vary their amplification factors in accordance with the absolute temperature, are located in the prestages of the respective inputs. The amplification factor A(T) of each preamplifier circuit is expressed by $$A(T) = Ao/T \quad (28)$$

where

T: absolute temperature

Ao: constant

The characteristic of a circuit resulting from the combination of the prestage amplifiers, which the characteristic is equivalent to that of the balanced modulator, is expressed by $$\begin{aligned}
\text{Iout1} - \text{Iout2} &= (I_{E1} - I_{E2}) \cdot \tanh((1/2) \cdot q \cdot A(T) \cdot \\
&\quad (\text{Vin1} - \text{Vin2})/kT) \\
&= (I_{E1} - I_{E2}) \cdot \tanh((1/2) \cdot q \cdot (Ao/T) \cdot \\
&\quad (\text{Vin1} - \text{Vin2})/kT) \\
&= (I_{E1} - I_{E2}) \cdot \tanh((1/2) \cdot q \cdot Ao \cdot \\
&\quad (\text{Vin1} - \text{Vin2})/k)
\end{aligned} \quad (29)$$

The term concerning temperature is not contained in the above equation. A multi-layered neural network using the above circuits has a less temperature-dependency.

FIG. 18(a) shows a temperature compensating circuit using the preamplifier as mentioned above. In the circuit, a thermo sensitive resistor is used as a feedback resistor of an operational amplifier. The circuit has such a characteristic that the amplification factor varies depending on temperature as shown in FIG. 18(c).

FIG. 18(c) is a circuit diagram showing the nonlinear operation unit of FIG. 16 including temperature compensating means. As shown, the circuit operable for the computing operation of the hyperbolic tangent function and the multiplication is constructed using bipolar transistors. Amplifiers 181, 184, and 187 having such sensitivity as to neutralize the temperature variation of the sensitivity of the bipolar transistor are located in the inputs of the nonlinear operation unit, viz., in the prestages of the nonlinear function operation circuits of the unit. With provision of those amplifiers having the temperature compensating function, the characteristics of the nonlinear operation unit is insensitive to temperature. Operational amplifier circuits 183, 186, and 189 are combined with feed back resistors of thermo sensitive resistors 182, 185 and 188, to form inverting amplifiers. The thermo sensitive resistor has such a temperature characteristic that its resistance is 0.33%/° K. at 300° K. in absolute temperature. In the inverting amplifiers, the amplification factor varies at 0.33%/° K. The temperature characteristic of the bipolar transistor is inversely proportional to absolute temperature. Accordingly, at 300° K. in absolute temperature its sensitivity reduces at approximately −0.33%/° K. With use of the preamplifiers, the temperature characteristic is neutralized.

The temperature compensating method using the preamplifiers can reduce the influence by the temperature variation but the circuitry to execute the compensating method sometimes is complicated. In a multi-layered neural network, no problem arises when the overall network is not influenced by temperature even if the individual layers of the network are influenced by temperature. The interlayer correction in the multilayered neural, network may be made by modulating an intensity corresponding to the weight, viz., $(I_{E1}-I_{E2})$ in the case of the balanced modulator, so as to be proportional to the absolute temperature.

As described above, using the function f as the combination of the hyperbolic tangent function and the multiplication, the internal potential in each neuron is expressed by $$ui = \Sigma j\{f(wji, uj)\} + \theta i$$

If a balanced modulator is used in lieu of the function f, the neuron internal potential can be expressed by the following equation depending on temperature $$ui = \Sigma\{f(wji, uj)\} + \beta i \quad (30)$$

$$Ui = \Sigma j(Ijiout1 - Ijiout2) + \theta i$$
$$= \Sigma j[(IjiE1 - IjiE2) \cdot \tanh\{(1/2) \cdot q \cdot R \cdot Uj/(k \cdot T)\}] + \theta i$$

where

Ui: current corresponding to the internal potential ui of a neuron i

θi: current corresponding to a threshold value θ1 of the neuron i

Ijiout1, Ijiout2: first and second output currents of the balanced modulator connecting from the neuron j to the neuron i IjiE1, IjiE2: first and second emitter currents of the balanced modulator connecting from the neuron j to the neuron i R: resistance of a resistor for converting the output current difference to voltage.

Let us consider a temperature compensating amplifier circuit with an amplification factor proportional to an absolute temperature. When the absolute temperature is T, an amplitude factor B(T) of the circuit is expressed by $$B(T) = T \cdot Bo \quad (31)$$

where

Bo: constant.

In the circuit, the emitter current and the threshold current of each balanced modulator are modulated by the amplification factor or temperature, and then U'i and U'j are As seen from the above equations, where two nerve neurons are connected, if the temperature compensation is carried out using the amplification factor B, the temperature characteristics of them cancel out, and consequently the terms of temperature marked with the underline in the equation are eliminated. The method for the temperature compensation between two neurons thus far described is applicable for the interneuron temperature compensation in any type of network.

As described above, the accumulation of a characteristic variation caused by temperature may be avoided by increasing the number of layers of the network. Additionally, all the terms of temperature can be eliminated in a manner that the amplification factor A is applied to the input coming from exterior, and the amplification factor B is applied to the output to exterior. While description about the temperature compensation has been made using the layered network, the same thing is correspondingly applicable for a recurrent network in which a variation of the output of a neuron becomes a variation of the input of the neuron per se.

Figure 20:
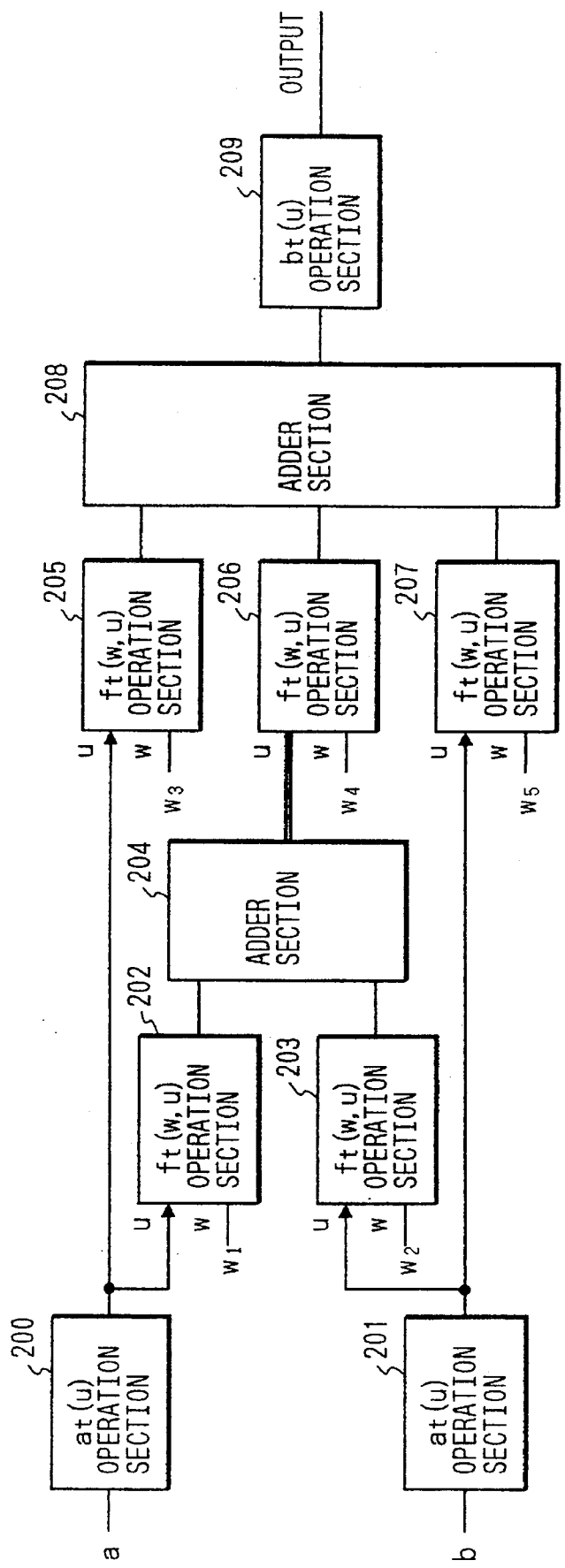
FIG. 20 is a block diagram showing a network containing temperature compensating circuits.

FIG. 19(a) is a circuit diagram showing a constituent element of the embodiment of the present invention, which additionally includes a circuit for modulating the weight in accordance with the absolute temperature of differential amplifier circuits 195 and 196. As shown in FIG. 19(a), the computing function of the hyperbolic tangent function and the multiplication is realized by using bipolar transistors 191 to 194. With regard to the current corresponding to the weight, current mirror circuits 197 and 198 in which the output emitters are connected to fixed resistors feed a current difference proportional to the absolute temperature and input current difference to the differential amplifier circuits 195 and 196. The current mirror circuit in which the output emitter is connected to the fixed resistor is widely used as a circuit which receives a constant current as an input current and outputs a current proportional to an absolute temperature. A current proportional to temperature is obtained by the current mirror circuits and is supplied to the differential amplifier circuits 295 and 196. As a result, the temperature characteristic of the output current difference is equal to the temperature characteristic of a sensitivity of the input voltage. The characteristic of this circuit is expressed by $f_t(w, u)$. The characteristics of an amplifier circuit, shown in FIG. 19(b), of which the amplification factor is proportional to an absolute temperature, and another amplifier circuit, shown in FIG. 19(c), of which the amplification factor is inversely proportional to an absolute temperature, are expressed by $a_t(x)$ and $b_t(x)$, respectively. In a network constructed using these circuits as shown in FIG. 20, the temperature characteristics in the network cancel out. In the network of FIG. 20

$$
\begin{aligned}
U'j &= \Sigma 1(B((I_{ijE1} - I_{ijE2}),T) \cdot \tanh((1/2) \cdot q \cdot R \cdot U_i'/(k \cdot T))) + B(\Gamma i,T) \\
&= \Sigma 1(T \cdot B_0 \cdot (I_{ijE1} - I_{ijE2}) \cdot \tanh((1/2) \cdot q \cdot R \cdot U_i'/(k \cdot T))) + T \cdot B_0 \cdot \theta j \\
&= T \cdot B0 \cdot (\Sigma 1((I_{ijE1} - I_{ijE2}) \cdot \tanh((1/2) \cdot q \cdot R \cdot U_i'/(k \cdot T))) + \theta j) \\
U'j &= \Sigma i(B((I_{jiE1} - I_{jiE2}),T) \cdot \tanh((1/2) \cdot q \cdot R \cdot U'j/(k \cdot T))) + B(\theta i,T) \\
&= T \cdot B0 \cdot (\Sigma i((I_{jiE1} - I_{jiE2}) \cdot \tanh((1/2) \cdot q \cdot R \cdot U'j/(k \cdot T))) + \\
&\quad \theta i)T \cdot B_0 \cdot (\Sigma i ((I_{1Ej1} - I_{jiE2}) \cdot \tanh ((1/2) \cdot R \cdot [T \cdot B0 \cdot (\Sigma 1 ((I_{ijE1} - \\
&\quad I_{ijE2}) \cdot \tanh((1/2) \cdot q \cdot R \cdot U'1/(k \cdot T))) + \theta j)]/(k \cdot T))) + \theta i) \\
&= T \cdot B0 \cdot (\Sigma i((I_{j1E1} - I_{jiE2}) \cdot \tanh((1/2) \cdot q \cdot R \cdot U'j/(k \cdot T))) + \theta i) \\
&= T \cdot B0 \cdot (\Sigma i ((I_{jiE1} - I_{jiE2}) \cdot \tanh ((1/2) \cdot q \cdot R \cdot [B0'19 (\Sigma 1 ((I1jE1 - \\
&\quad IijE2) \cdot \mathrm{tabh}((1/2) \cdot q \cdot R \cdot U'1/(k \cdot T))) + \theta j]/k)) + \theta i)
\end{aligned}
\quad (32)
$$

where

U'i: current corresponding to the internal potential ui of a neuron i after temperature compensation U'j: current corresponding to the internal potential uj of the neuron j after temperature compensation the compensation is made for the portions indicated by double lines.

Figure 17:
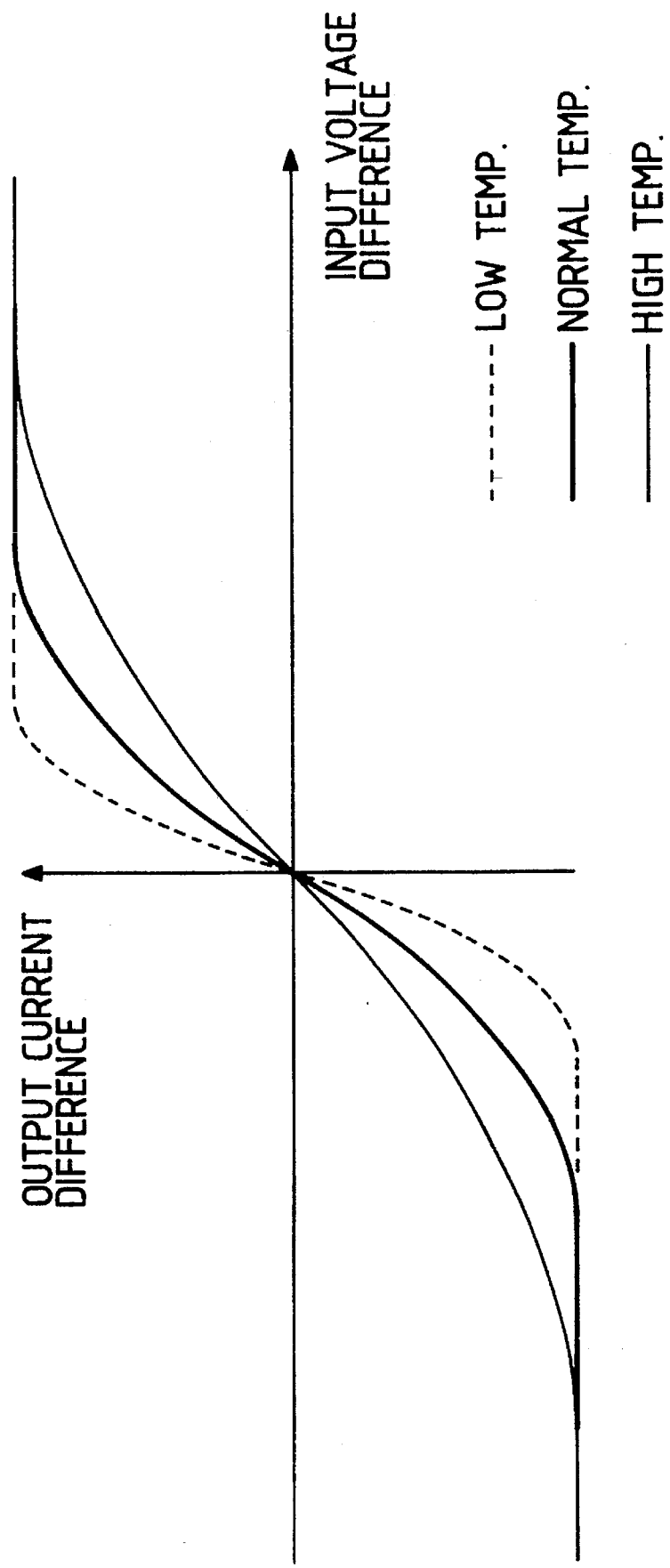
FIG. 17 is a graph showing the temperature characteristic of a sigmoid synapsis circuit.
Figure 21A:
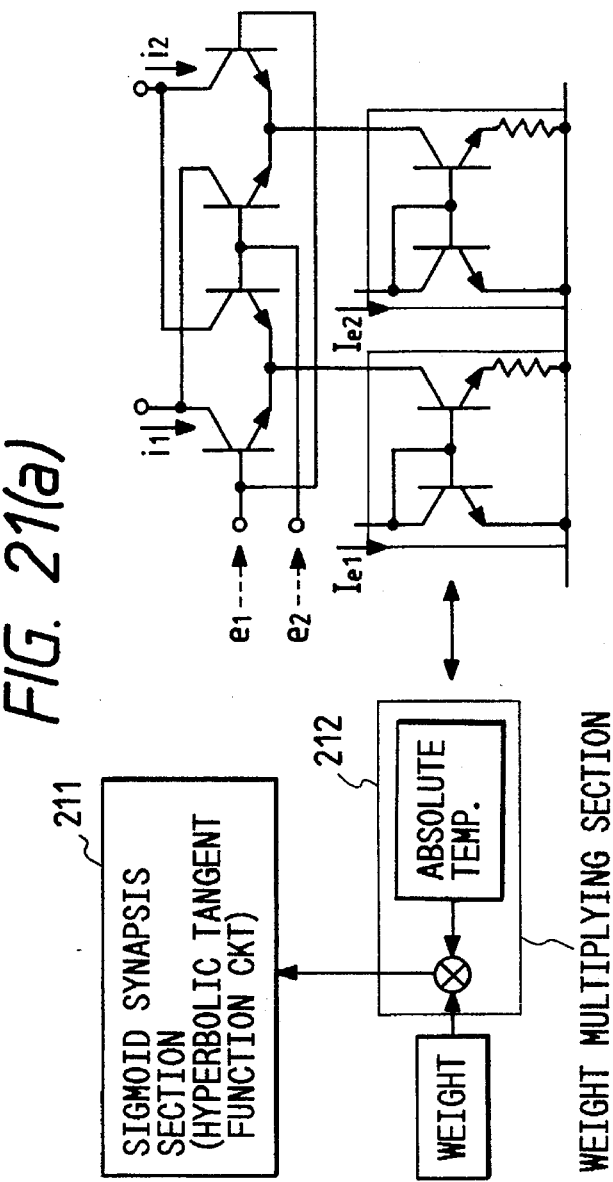
FIG. 21(a) functionally illustrates the nonlinear function operation circuit of FIG. 19.
Figure 21B:
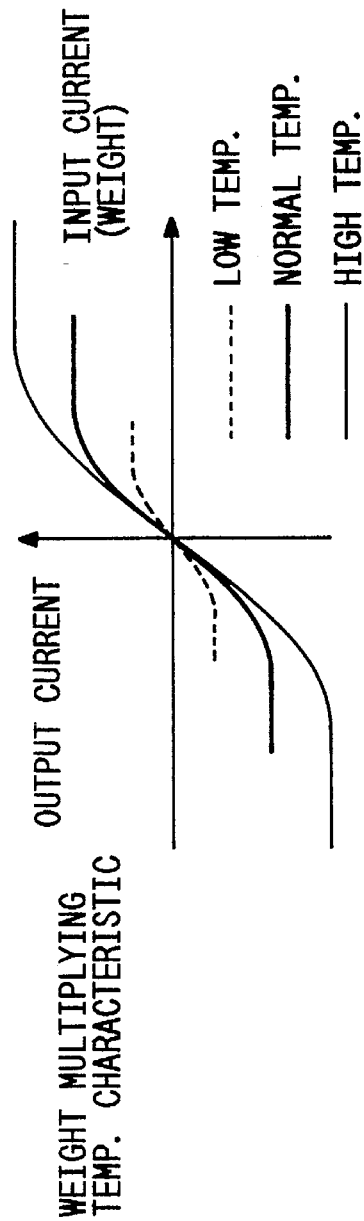
FIG. 21(b) is a graph showing the temperature characteristic of the weight multiplying section.

The temperature compensation in the FIG. 20 circuitry of the network structure will be described in more detail. The nonlinear function operation circuit of FIG. 19(a), illustrated in block form in FIG. 21(a), is made up of a sigmoid synapsis section (hyperbolic tangent function circuit) 211 and a weight multiplying circuit 212. The sigmoid synapsis section 211 is mathematically described by the equation (27), as already described. The output signal of the sigmoid synapsis section is inversely proportional to an absolute temperature, as shown in FIG. 17. The weight multiplying circuit 212 characteristically operates to modulate the weight in proportion with an absolute temperature, as shown in FIG. 21(b).

Figure 22:
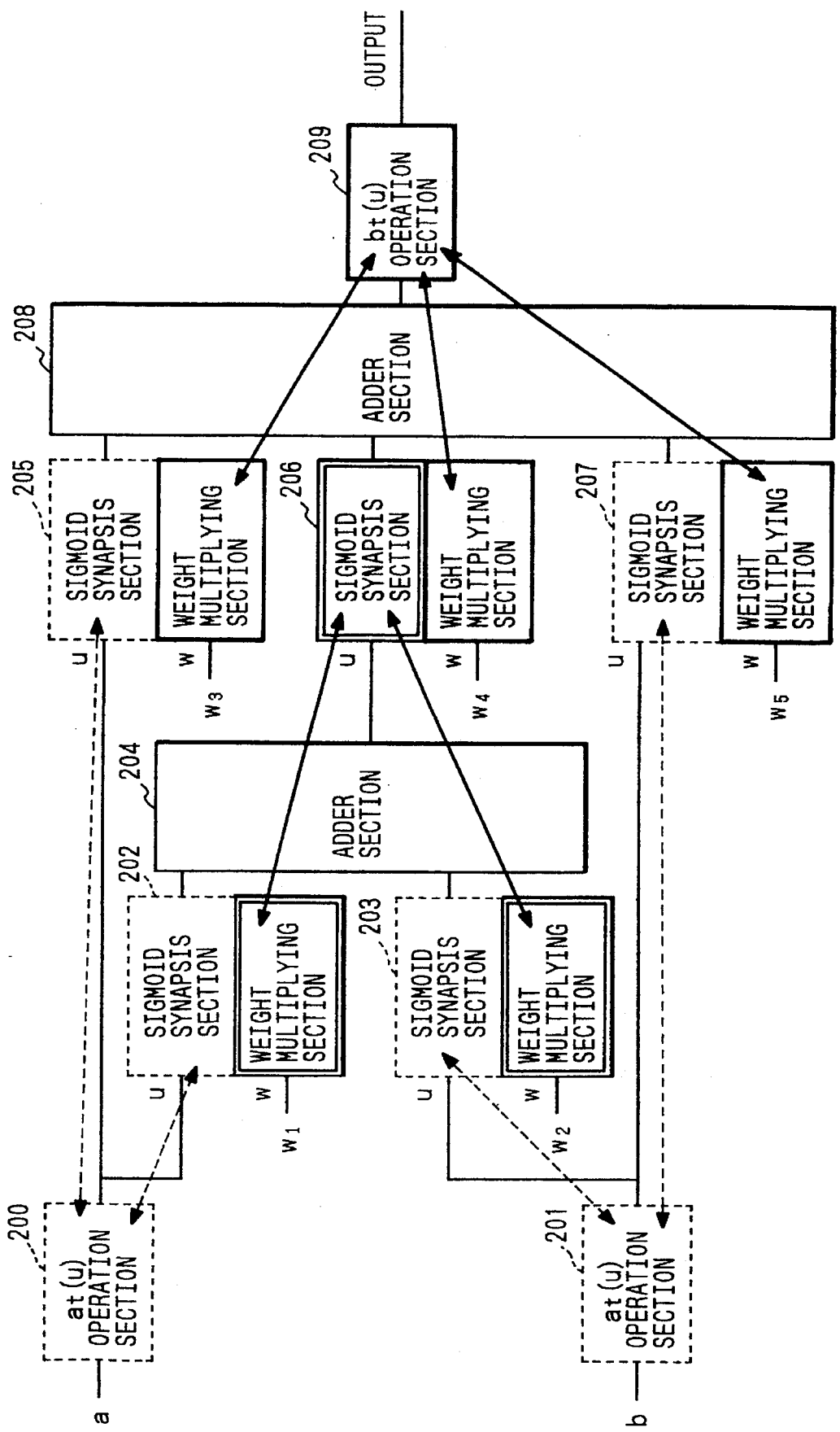
FIG. 22 is a block diagram for explaining the neutralizing operation of the temperature characteristics in the network structure circuit of FIG. 20.

FIG. 22 is a block diagram for explaining the neutralizing operation of the temperature characteristics in the network structure circuit of FIG. 20. The temperature characteristic of the sigmoid synapsis part in a $f_r(w, u)$ operation section 206 is neutralized by the temperature characteristics of the multiplying parts in $f_r(w, u)$ operation circuits 202 and 203. The temperature characteristic of the sigmoid synapsis part in a $f_r(w, u)$ operation section 202 is neutralized by the temperature characteristics of an $a_r(u)$ operation section 200 of which the amplification factor is proportional to absolute temperature. The temperature characteristic of the sigmoid synapsis part in a $f_r(w, u)$ operation section 203 is neutralized by the temperature characteristics of an $a_r(u)$ operation section 201. The temperature characteristic of the multiplying parts in the $f_r(w, u)$ operation section 205 to 207 is neutralized by the temperature characteristics of an $b_r(u)$ operation section 209 of which the amplification factor is inversely proportional to absolute temperature.

In the conventional neural network, a processing unit is constructed with a circuit modeled on a neuron, and a plural number of the circuits are networked in a multiple of layers. The processing unit, which performs the computing operation of the equations (1) and (2), includes a multiplying section for multiplying an input xj and a weight wj, an adder section for adding together the results of the multiplying operations by the multiplying section, and a section for processing the output signal of the adder section by a nonlinear operation g(u1). The present invention employs the construction of the processing unit different from that of the conventional one. Means for computing the equation (4) is used as an operation unit (unit cell). A network is constructed using the operation units. The operation of the network is equivalent to the operation of an overall neural network. In the present invention, as described by the equation (4), the inputs uj are processed by a nonlinear function g, the results of the processing by the nonlinear function are multiplied by a weight corresponding to a strength of bonding of synapses, the products of the multiplying operations are added together, and a threshold value θi is added to the sum of the products. In this way, the internal potential of the neuron is obtained. Thus, the computing operation of an operation unit is performed on the basis of a value corresponding to the internal potential of a neuron, which is the output signal from another neuron. Therefore, there is no need of computing a value corresponding to the output potential of the neuron. This simplifies the construction of the operation unit and increases the computing speed.

In the present invention, as described above, the input signals u are processed by the nonlinear function g(uj), and the function values resulting from the processing are multiplied by the weight value wji. Alternatively, a function (f(wji, uj)), which produces the results of operations equivalent to the results of the computing process of the nonlinear function g(uj) and the multiplying process of the weight wji, may be used. In this case, the circuit construction is considerably simplified.

The technical idea of the present invention simplifies the circuit construction when the nonlinear operation unit is realized by an analog circuit, and reduces an error arising from temperature variation and the circuit per se and computing time. The foregoing description of preferred embodiments of the invention has been presented for purposes of illustration and description. It is not intended to be exhaustive or to limit the invention to the precise form disclosed, and modifications and Variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A nonlinear operation unit, comprising:

nonlinear function operation means for performing the computing operation of a function, which produces the results of operations equivalent to the results of the process carried out by computing at least one input signal by using a nonlinear function, and multiplying the results of the computing operations by weight values; and adder means for adding together the results of the computing operations by said nonlinear function operation means and adding a threshold value to the sum of these results;

wherein said nonlinear function operation means includes differential amplifier circuits, each said differential amplifier circuit consisting of a pair of amplifier elements each having at least three terminals, said paired amplifier elements being coupled with each other at the first terminals, a voltage difference proportional to the input signal is applied to between the second terminals of said paired amplifier elements each having at least three terminals, a current proportional to the weight is fed to the first terminals, whereby the output signal is produced as a current difference at the third terminals of the amplifier elements each having at least three terminals and constituting differential amplifier circuits.

2. A nonlinear operation unit, comprising:

nonlinear function operation means for performing the computing operation of a function, which produces the results of operations equivalent to the results of the process carried out by computing at least one input signal by using a nonlinear function, and multiplying the results of the computing operations by weight values; and adder means for adding together the results of the computing operations by said nonlinear function operation means;

wherein said nonlinear function operation means comprises:

a first differential amplifier circuit including first and second amplifier elements of at least three terminals being connected to each other at the first terminals;

a second differential amplifier circuit including third and fourth amplifier elements of at least three terminals being connected to each other at the first terminals; and wherein the second terminals of the first and fourth amplifier elements of at least three terminals are connected to form a first input terminal, the second terminals of the second and third amplifier elements of at least three terminals are connected to form a second input terminal, a voltage proportional to the input signal is applied to between the first and second input terminals, the third terminals of the first and third amplifier elements of at least three terminals are connected to form a first output terminal, the third terminals of the second and fourth amplifier elements of at least three terminals are connected to form a second output terminal, a current difference proportional to the weight value is supplied to the first terminals of the first and second differential amplifier circuits, whereby a current difference proportional to the product of multiplying one of a positive value and a negative value and the result of processing the input signal by a bounded, monotonous function is produced at the first and second output terminals.

3. The nonlinear operation unit according to one of claims 1 or 2, in which the threshold value is zero.

4. The nonlinear operation unit according to any of claims 1 or 2, further comprising:

first means for detecting an intensity of disturbance; and means for correcting the input signals so as to reduce an error, in accordance with the disturbance intensity obtained by the first means.

5. The nonlinear operation unit according claim 4, in which said first means is detecting means for detecting absolute temperature, and said second means is multiplying means for multiplying the values proportional to the absolute temperature derived from the detecting means and the input values of the nonlinear function.

6. The nonlinear operation unit according to any of claims 1 or 2, further comprising:

first means for detecting an intensity of disturbance; and second means, located at the inputs, for changing the weight values and threshold values so as to reduce the influence by the disturbance, in accordance with the disturbance intensity obtained by the first means.

7. A data processing apparatus comprising:

a plurality of nonlinear operation units, each having nonlinear function operation means for performing a computing operation of a function, for producing results of operations equivalent to results of a process carried out by computing at least one input signal using a nonlinear function, and multiplying results of the computing by weight values; and adder means for adding together the results of the computing by the results of the nonlinear function operation means to produce a sum and adding a threshold value to the sum of these results, whereby a desired function is set up by properly setting the weight and threshold values;

detecting means for detecting absolute temperature;

first multiplying means for multiplying a value proportional to the absolute temperature detected by said detecting means by an input signal;

second multiplying means for multiplying a value proportional to absolute temperature derived from the first multiplying means and each weight value, which is to be multiplied by the result of the operation by the nonlinear function operation means; and third multiplying means for multiplying a value inversely proportional to the detected absolute temperature and an output signal.

8. A data processing apparatus comprising:

a plurality of nonlinear operation units, each having nonlinear function operation means for performing a computing operation of a function, for producing results of operations equivalent to the results of a process carried out by computing at least one input signal using a nonlinear function, and multiplying results of the computing by weight values, the nonlinear function operation means including a first differential amplifier circuit including first and second amplifier elements of at least three terminals being connected to each other at first terminals;

a second differential amplifier circuit including third and fourth amplifier elements of at least three terminals being connected to each other at the first terminals; and weight multiplying circuits for supplying current signals, each of a current difference proportional to a weight value, to the first terminals of the first and second differential amplifier circuits, and for modulating the weight value by absolute temperature, whereby characteristic variations of the first and second differential amplifier circuits of the nonlinear function operation means in a first stage cancel out as a result of a modulation circuit characteristic variation of the nonlinear function operation means located in a succeeding stage; and adder means for adding together the results of the computing by the results of the nonlinear function operation means to produce a sum and adding a threshold value to the sum, whereby a desired function is set up by properly setting the weight and threshold values.

9. The data processing apparatus according to claim 8, further comprising:

detecting means for detecting absolute temperature;

first multiplying means for multiplying a value proportional to the absolute temperature detected by said detecting means by an input signal;

second multiplying means for multiplying a value proportional to absolute temperature derived from the first multiplying means and each weight value, which is to be multiplied by the result of the operation by the nonlinear function operation means; and third multiplying means for multiplying a value inversely proportional to the detected absolute temperature and an output signal.

* * * * *